US010948976B1

(12) United States Patent
Whitmire et al.

(10) Patent No.: US 10,948,976 B1
(45) Date of Patent: Mar. 16, 2021

(54) SYSTEMS AND METHODS FOR ELECTRIC DISCHARGE-BASED SENSING VIA WEARABLES DONNED BY USERS OF ARTIFICIAL REALITY SYSTEMS

(71) Applicant: Facebook Technologies, LLC, Menlo Park, CA (US)

(72) Inventors: Eric Michael Whitmire, Seattle, WA (US); Wolf Kienzle, Seattle, WA (US); David R. Perek, Seattle, WA (US); Hrvoje Benko, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/505,467

(22) Filed: Jul. 8, 2019

Related U.S. Application Data

(60) Provisional application No. 62/801,991, filed on Feb. 6, 2019.

(51) Int. Cl.
| | |
|---|---|
| *G06F 3/044* | (2006.01) |
| *G04G 21/08* | (2010.01) |
| *H02J 7/00* | (2006.01) |
| *G06F 1/32* | (2019.01) |
| *H04B 3/36* | (2006.01) |
| *H02J 7/02* | (2016.01) |
| *G06F 21/32* | (2013.01) |

(Continued)

(52) U.S. Cl.
CPC .............. *G06F 3/011* (2013.01); *G06F 3/014* (2013.01); *H02J 7/00* (2013.01); *H02J 50/10* (2016.02)

(58) Field of Classification Search
CPC .......... G06F 3/011; G06F 21/35; G06F 3/014; G06F 3/044; G01L 1/248; G06K 5/00; H02J 7/00; H02J 50/10; G04G 21/08
See application file for complete search history.

(56) References Cited

U.S. PATENT DOCUMENTS 5,781,511 A * 7/1998 Yasukawa .......... A61B 5/02438
368/10
6,047,301 A * 4/2000 Bjorklund ............... G06F 1/163
708/139

(Continued)

FOREIGN PATENT DOCUMENTS

| CN | 105877703 | * | 8/2016 | .............. A61B 5/00 |
| CN | 108667099 | * | 10/2018 | .............. H02J 7/00 |

*Primary Examiner* — Lin Li
(74) *Attorney, Agent, or Firm* — FisherBroyles, LLP

(57) ABSTRACT

A system may include a wearable dimensioned to be donned by a user of an artificial reality system. The system may also include an energy measuring device incorporated into the wearable. The energy measuring device may measure an electrical energy differential between a body of the user and a surface within an environment occupied by the user. The system may further include at least one processing device communicatively coupled to the energy measuring device. The processing device may detect, based at least in part on the electrical energy differential measured by the energy measuring device, an interaction between the user and the surface within the environment. In response to this detection, the processing device may generate an input command for the artificial reality system based at least in part on the interaction detected between the user and the surface. Various other systems and methods are also disclosed.

18 Claims, 16 Drawing Sheets

(51) Int. Cl.
  *A61B 5/00*    (2006.01)
  *A61B 5/11*    (2006.01)
  *H04W 68/02*   (2009.01)
  *G01C 9/00*    (2006.01)
  *G06K 5/00*    (2006.01)
  *G06F 3/00*    (2006.01)
  *G04B 47/06*   (2006.01)
  *G06F 3/01*    (2006.01)
  *H02J 50/10*   (2016.01)

(56) References Cited

U.S. PATENT DOCUMENTS

| | | | |
|---|---|---|---|
| 6,236,037 B1 * | 5/2001 | Asada | G01L 1/248 250/221 |
| 6,695,207 B1 * | 2/2004 | Norris, Jr. | B60R 25/24 235/382 |
| 9,226,697 B1 * | 1/2016 | Patil | A61B 5/681 |
| 9,928,700 B1 * | 3/2018 | Levesque | G08B 6/00 |
| 2004/0243342 A1 * | 12/2004 | Rekimoto | G06F 3/015 702/150 |
| 2004/0257202 A1 * | 12/2004 | Coughlin | G06F 21/35 340/5.82 |
| 2015/0382321 A1 * | 12/2015 | Ryu | H04M 1/7253 455/458 |
| 2016/0038055 A1 * | 2/2016 | Wheeler | A61B 5/0533 600/547 |
| 2016/0204646 A1 * | 7/2016 | Park | H02J 50/12 320/108 |
| 2017/0011210 A1 * | 1/2017 | Cheong | G06F 21/32 |
| 2017/0038333 A1 * | 2/2017 | Turner | G11C 19/28 |
| 2017/0310144 A1 * | 10/2017 | Madau | H02J 50/10 |
| 2018/0039233 A1 * | 2/2018 | Shim | G04G 21/02 |
| 2018/0150126 A1 * | 5/2018 | Xu | G06F 1/1635 |
| 2018/0175643 A1 * | 6/2018 | Shim | H02J 7/0042 |
| 2019/0310706 A1 * | 10/2019 | Wang | H02J 7/025 |
| 2020/0169107 A1 * | 5/2020 | Joshi | H02J 7/0047 |

* cited by examiner

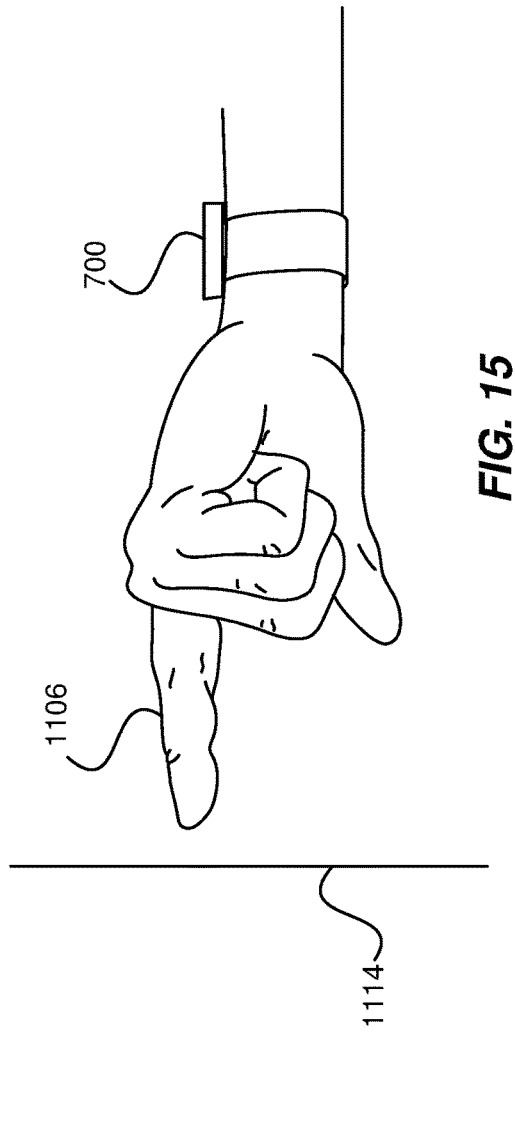
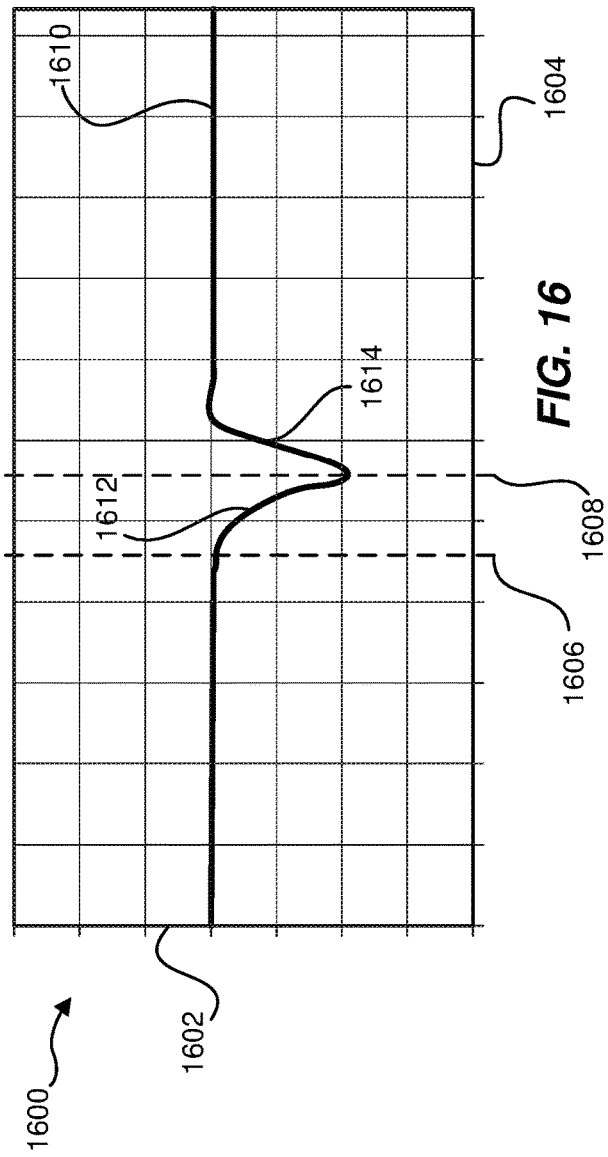

SYSTEMS AND METHODS FOR ELECTRIC DISCHARGE-BASED SENSING VIA WEARABLES DONNED BY USERS OF ARTIFICIAL REALITY SYSTEMS

CROSS REFERENCE TO RELATED APPLICATION

This application claims benefit of U.S. Provisional Application No. 62/801,991, titled "SYSTEMS AND METHODS FOR ELECTRIC DISCHARGE-BASED SENSING VIA WEARABLES DONNED BY USERS OF ARTIFICIAL REALITY SYSTEMS," filed 6 Feb. 2019, the disclosure of which is incorporated, in its entirety, by this reference.

BACKGROUND

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality, augmented reality, mixed reality, hybrid reality, or some combination and/or variation one or more of the same. Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Traditional artificial reality systems may incorporate hands-on controllers that enable users to enter input capable of modifying their artificial reality experiences. Unfortunately, these hands-on controllers may limit the users' mobility and/or movements, especially hand-based actions and/or gestures. To resolve these limitations, some artificial reality systems may incorporate traditional wearables capable of sensing a few motions, actions, and/or gestures made by users. The sensing of other motions, actions, and/or gestures, however, has proved challenging and/or impracticable via such traditional wearables.

The instant disclosure, therefore, identifies and addresses a need for additional systems and methods for electric discharge-based sensing via wearables donned by users of artificial reality systems.

SUMMARY

As will be described in greater detail below, the instant disclosure generally relates to systems and methods for electric discharge-based sensing via wearables donned by users of artificial reality systems. In some embodiments, a system may include a wearable dimensioned to be donned by a user of an artificial reality system. The system may also include an energy measuring device incorporated into the wearable. The energy measuring device may measure an electrical energy differential between a body of the user and a surface within an environment occupied by the user. The system may further include at least one processing device communicatively coupled to the energy measuring device. The processing device may detect, based at least in part on the electrical energy differential measured by the energy measuring device, an interaction between the user and the surface within the environment. In response to this detection, the processing device may generate an input command for the artificial reality system based at least in part on the interaction detected between the user and the surface.

In some examples, the electrical energy differential may include and/or represent an amount of electric potential between the body of the user and the surface within the environment. In such examples, the energy measuring device may include and/or represent an electrometer that electrically grounds to the body of the user and/or measures the amount of electric potential between the body of the user and the surface within the environment. The processing device may detect the interaction between the user and the surface based at least in part on the amount of electric potential measured by the electrometer.

In some examples, the system may also include a body-charging device that charges the body of the user relative to the surface within the environment. In one example, the body-charging device may include a grounding electrode that establishes an electrical reference to the surface. Additionally or alternatively, the body-charging device may include a charging electrode that electrically couples an output of the body-charging device to the body of the user.

In such examples, the amount of electric potential measured by the electrometer may include and/or represent an electric charge transferred from the body of the user to the surface within the environment when the user touches the surface with a body part. The interaction between the user and the surface within the environment may include and/or represent the user touching and/or releasing the surface with the body part.

In some examples, the processing device may analyze the electric charge transfer measured by the electrometer. In such examples, the processing device may determine that the user has touched the surface based at least in part on the analysis of the electric charge transfer measured by the electrometer.

In some examples, the electrical energy differential may include and/or represent an amount of electric current flowing from the surface within the environment to the body of the user. In such examples, the energy measuring device may include and/or represent a current monitor that measures the amount of electric current flowing from the surface to the body of the user via a skin-touching electrode that electrically couples to the body of the user. The processing device may detect the interaction between the user and the surface based at least in part on the amount of electric current flowing from the surface to the body of the user.

In some examples, the system may also include a surface-charging device incorporated into the wearable. In such examples, the surface-charging device may charge the surface within the environment via a surface-charging electrode that electrically couples the surface-charging device to the surface.

In some examples, the processing device may analyze the amount of electric current measured by the current monitor. In such examples, the processing device may determine that the user has touched the surface based at least in part on the analysis of the electric current measured by the current monitor.

In some examples, the processing device may analyze the electrical energy differential measured by the energy measuring device via a machine learning model. In such examples, the processing device may detect, within the electrical energy differential via the machine learning model, a pattern indicative of the user touching the surface. The processing device may then determine that the user has touched the surface based at least in part on the pattern detected within the electrical energy differential via the machine learning model.

In some examples, the processing device may facilitate modifying at least one virtual component of the artificial reality system to account for the interaction detected between the user and the surface. In such examples, the input command generated by the processing device facilitates and/or cause such modifications.

A corresponding wearable may include a fastener dimensioned to facilitate securing the wearable to a user of an artificial reality system. The wearable may also include an energy measuring device that measures an electrical energy differential between a body of the user and a surface within an environment occupied by the user. The wearable may further include at least one processing device communicatively coupled to the energy measuring device. The processing device may detect, based at least in part on the electrical energy differential measured by the energy measuring device, an interaction between the user and the surface within the environment. In response to this detection, the processing device may generate an input command for the artificial reality system based at least in part on the interaction detected between the user and the surface.

A corresponding method may include (1) measuring, by an energy measuring device incorporated into a wearable donned by a user of an artificial reality system, an electrical energy differential between a body of the user and a surface within an environment occupied by the user, (2) detecting, by a processing device communicatively coupled to the energy measuring device, an interaction between the user and the surface within the environment based at least in part on the electrical energy differential measured by the energy measuring device, and then (3) generating, by the processing device, an input command for the artificial reality system based at least in part on the interaction detected between the user and the surface within the environment in response to detecting the interaction between the user and the surface.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

FIG. 15 is an illustration in which a user donning an exemplary wearable makes physical contact with a surface.

FIG. 16 is an illustration of an exemplary electrical signal that represents an electric discharge detected by an energy measuring device incorporated into a wearable donned by a user of an artificial reality system.

Figure 1:
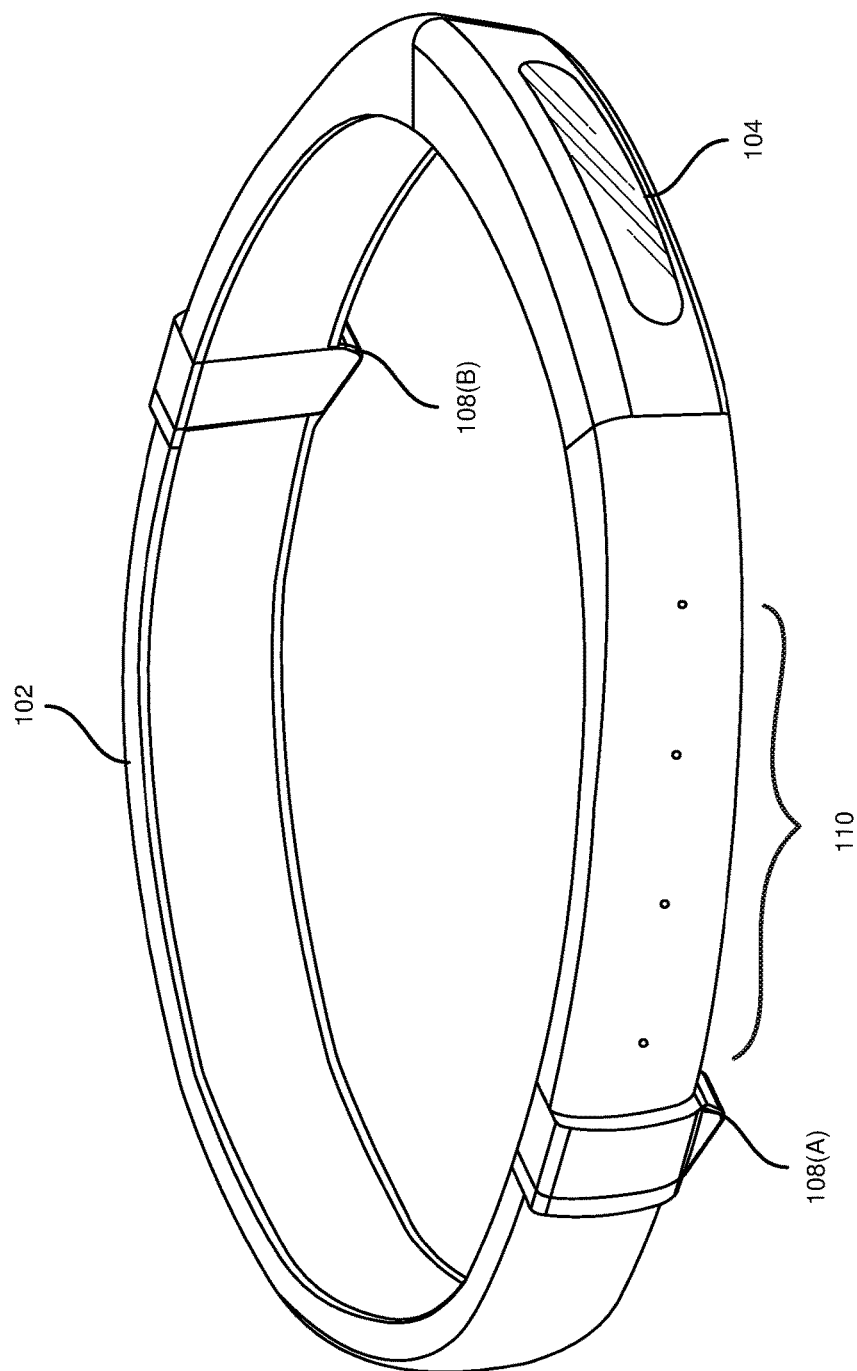
FIG. 1 is an illustration of an exemplary artificial-reality headband that may be used in connection with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for electric discharge-based sensing via wearables donned by users of artificial reality systems. As will be explained in greater detail below, embodiments of the present disclosure may enable users of artificial reality systems to provide hands-free user input that modifies their artificial reality experiences. For example, a wearable (such as a wristband) donned by a user may implement electric discharge-based sensing in connection with the user's body. In one example, the wearable may measure the electric potential between the body of the user and the user's environment (e.g., the floor on which the user is standing). Additionally or alternatively, the wearable may measure the amount of electric charge flowing from the user's body to the user's environment. These measurements may represent and/or be used to detect physical contact, movement, and/or gestures made by the user within the environment.

In one example, the user may also don and/or wear a body-charging device. In this example, the body-charging device may charge the user's body such that the user's body builds up a charge relative to his or her environment. When the user touches a surface within his or her environment, the user's body may release the built-up charge, and the wearable may measure the amount of charge released by touching the surface. This measurement may indicate that the user's body has actually made physical contact with the surface. In response to such contact, the artificial reality system may modify the user's experience to account for the user having touched the surface in this way.

In another example, the wearable may include a surface-charging device, a surface-charging electrode, and a skin-touching electrode. In this example, the user may place the surface-charging electrode of the wearable against a surface within his or her environment. The surface-charging device may then charge the surface within the user's environment via the surface-charging electrode. While the surface is charged, the user may touch the surface with his or her finger, thereby releasing the charge built up in the surface and enabling the charge to flow to the user's body in the form of electric current. The wearable may measure the amount of electric current that flows from the surface to the user's body due to this discharge. The measurement may indicate that the user's finger has actually made physical contact with the surface. In response to such contact, the artificial reality system may modify the user's artificial reality experience to account for the user having touched the surface in this way.

The following will provide, with reference to FIGS. 1-6, detailed descriptions of various types of exemplary artificial reality devices that may facilitate and/or contribute to a user's artificial reality experience. Detailed descriptions of exemplary apparatuses and/or systems that implement electric discharge-based sensing via wearables will be described in connection with FIGS. 7-15. Detailed descriptions of an exemplary electrical signal detected by a wearable will be described in connection with FIG. 16. In addition, the discussion corresponding to FIG. 17 will provide detailed descriptions of an exemplary method for electric discharge-based sensing via wearables donned by users of artificial reality systems.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 100 in FIG. 1. Other artificial reality systems may include a NED that also provides visibility into the real world (e.g., augmented-reality system 200 in FIG. 2) or that visually immerses a user in an artificial reality (e.g., virtual-reality system 300 in FIG. 3). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 1, augmented-reality system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. Augmented-reality system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, augmented-reality system 100 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 100 may not include a NED, augmented-reality system 100 may include other types of screens or visual feedback devices (e.g., a display screen integrated into a side of frame 102).

Figure 2:
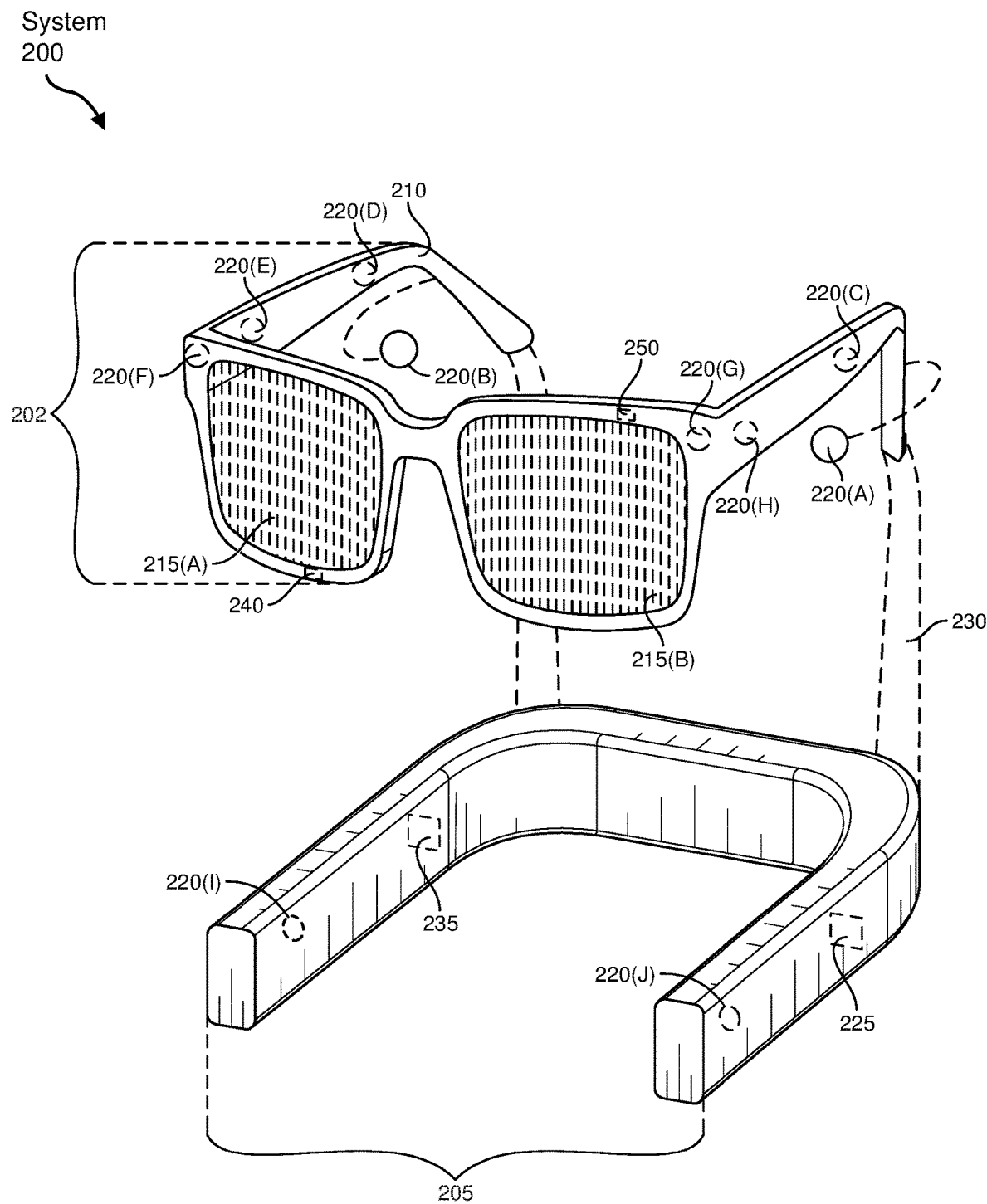
FIG. 2 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 2, augmented-reality system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While augmented-reality system 200 includes two displays, embodiments of this disclosure may be implemented in augmented-reality systems with a single NED or more than two NEDs.

In some embodiments, augmented-reality system 200 may include one or more sensors, such as sensor 240. Sensor 240 may generate measurement signals in response to motion of augmented-reality system 200 and may be located on substantially any portion of frame 210. Sensor 240 may represent a position sensor, an inertial measurement unit (IMU), a depth camera assembly, or any combination thereof. In some embodiments, augmented-reality system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof. Augmented-reality system 200 may also include a microphone array with a plurality of acoustic transducers 220(A)-220(J), referred to collectively as acoustic transducers 220. Acoustic transducers 220 may be transducers that detect air pressure variations induced by sound waves. Each acoustic transducer 220 may be configured to detect sound and convert the detected sound into an electronic format (e.g., an analog or digital format). The microphone array in FIG. 2 may include, for example, ten acoustic transducers: 220(A) and 220(B), which may be designed to be placed inside a corresponding ear of the user, acoustic transducers 220(C), 220(D), 220(E), 220(F), 220 (G), and 220(H), which may be positioned at various locations on frame 210, and/or acoustic transducers 220(I) and 220(J), which may be positioned on a corresponding neckband 205.

In some embodiments, one or more of acoustic transducers 220(A)-(F) may be used as output transducers (e.g., speakers). For example, acoustic transducers 220(A) and/or 220(B) may be earbuds or any other suitable type of headphone or speaker.

The configuration of acoustic transducers 220 of the microphone array may vary. While augmented-reality system 200 is shown in FIG. 2 as having ten acoustic transducers 220, the number of acoustic transducers 220 may be greater or less than ten. In some embodiments, using higher numbers of acoustic transducers 220 may increase the amount of audio information collected and/or the sensitivity and accuracy of the audio information. In contrast, using a lower number of acoustic transducers 220 may decrease the computing power required by the controller 250 to process the collected audio information. In addition, the position of each acoustic transducer 220 of the microphone array may vary. For example, the position of an acoustic transducer 220 may include a defined position on the user, a defined coordinate on frame 210, an orientation associated with each acoustic transducer, or some combination thereof.

Acoustic transducers 220(A) and 220(B) may be positioned on different parts of the user's ear, such as behind the pinna or within the auricle or fossa. Or, there may be additional acoustic transducers on or surrounding the ear in addition to acoustic transducers 220 inside the ear canal. Having an acoustic transducer positioned next to an ear canal of a user may enable the microphone array to collect information on how sounds arrive at the ear canal. By positioning at least two of acoustic transducers 220 on either side of a user's head (e.g., as binaural microphones), augmented-reality device 200 may simulate binaural hearing and capture a 3D stereo sound field around about a user's head. In some embodiments, acoustic transducers 220(A) and 220(B) may be connected to augmented-reality system 200 via a wired connection 230, and in other embodiments, acoustic transducers 220(A) and 220(B) may be connected to augmented-reality system 200 via a wireless connection (e.g., a Bluetooth connection). In still other embodiments, acoustic transducers 220(A) and 220(B) may not be used at all in conjunction with augmented-reality system 200.

Acoustic transducers 220 on frame 210 may be positioned along the length of the temples, across the bridge, above or below display devices 215(A) and 215(B), or some combination thereof. Acoustic transducers 220 may be oriented such that the microphone array is able to detect sounds in a wide range of directions surrounding the user wearing the augmented-reality system 200. In some embodiments, an optimization process may be performed during manufacturing of augmented-reality system 200 to determine relative positioning of each acoustic transducer 220 in the microphone array.

In some examples, augmented-reality system 200 may include or be connected to an external device (e.g., a paired device), such as neckband 205. Neckband 205 generally represents any type or form of paired device. Thus, the following discussion of neckband 205 may also apply to various other paired devices, such as charging cases, smart watches, smart phones, wrist bands, other wearable devices, hand-held controllers, tablet computers, laptop computers and other external compute devices, etc.

As shown, neckband 205 may be coupled to eyewear device 202 via one or more connectors. The connectors may be wired or wireless and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, Pairing external devices, such as neckband 205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 205 may be communicatively coupled with eyewear device 202 and/or to other devices. These other devices may provide certain functions (e.g., tracking, localizing, depth mapping, processing, storage, etc.) to augmented-reality system 200. In the embodiment of FIG. 2, neckband 205 may include two acoustic transducers (e.g., 220(I) and 220(J)) that are part of the microphone array (or potentially form their own microphone subarray). Neckband 205 may also include a controller 225 and a power source 235.

Acoustic transducers 220(I) and 220(J) of neckband 205 may be configured to detect sound and convert the detected sound into an electronic format (analog or digital). In the embodiment of FIG. 2, acoustic transducers 220(I) and 220(J) may be positioned on neckband 205, thereby increasing the distance between the neckband acoustic transducers 220(I) and 220(J) and other acoustic transducers 220 positioned on eyewear device 202. In some cases, increasing the distance between acoustic transducers 220 of the microphone array may improve the accuracy of beamforming performed via the microphone array. For example, if a sound is detected by acoustic transducers 220(C) and 220(D) and the distance between acoustic transducers 220(C) and 220 (D) is greater than, e.g., the distance between acoustic transducers 220(D) and 220(E), the determined source location of the detected sound may be more accurate than if the sound had been detected by acoustic transducers 220(D) and 220(E).

Controller 225 of neckband 205 may process information generated by the sensors on 205 and/or augmented-reality system 200. For example, controller 225 may process information from the microphone array that describes sounds detected by the microphone array. For each detected sound, controller 225 may perform a direction-of-arrival (DOA) estimation to estimate a direction from which the detected sound arrived at the microphone array. As the microphone array detects sounds, controller 225 may populate an audio data set with the information. In embodiments in which augmented-reality system 200 includes an inertial measurement unit, controller 225 may compute all inertial and spatial calculations from the IMU located on eyewear device 202. A connector may convey information between augmented-reality system 200 and neckband 205 and between augmented-reality system 200 and controller 225. The information may be in the form of optical data, electrical data, wireless data, or any other transmittable data form. Moving the processing of information generated by augmented-reality system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 300 in FIG. 3, that mostly or completely covers a user's field of view. Virtual-reality system 300 may include a front rigid body 302 and a band 304 shaped to fit around a user's head. Virtual-reality system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 300 and/or virtual-reality system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 200 and/or virtual-reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 100, augmented-reality system 200, and/or virtual-reality system 300 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
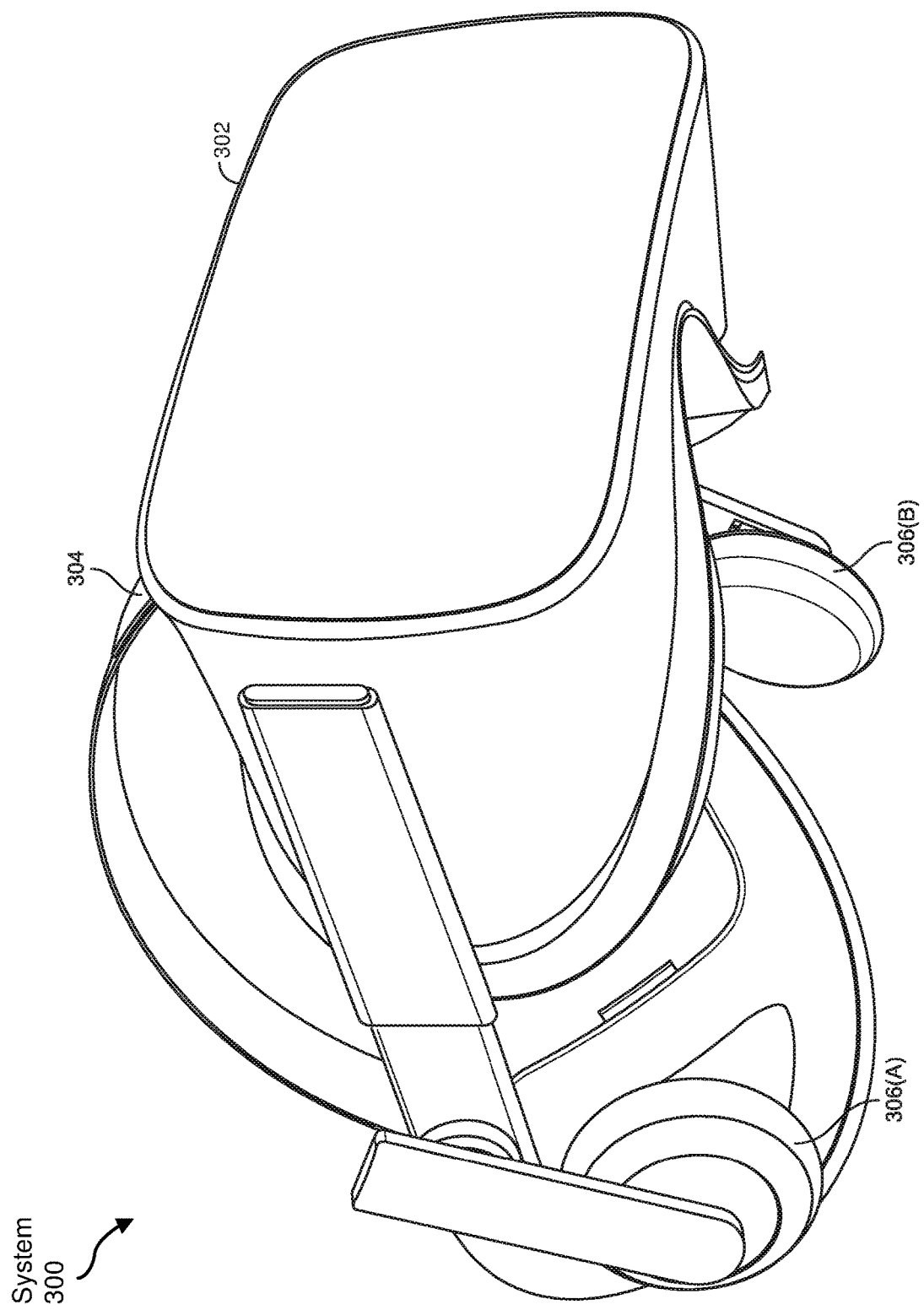
FIG. 3 is an illustration of an exemplary virtual-reality headset that may be used in connection with embodiments of this disclosure.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some augmented reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented reality and virtual reality devices (such as systems 100, 200, and 300 of FIGS. 1-3, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented reality headset or virtual reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented reality or virtual reality headset may initiate a DOA analysis to determine the location of a sound source. The DOA analysis may include analyzing the intensity, spectra, and/or arrival time of each sound at the artificial reality device to determine the direction from which the sounds originated. The DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The augmented reality or virtual reality headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensors that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

As noted, artificial reality systems 100, 200, and 300 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4:
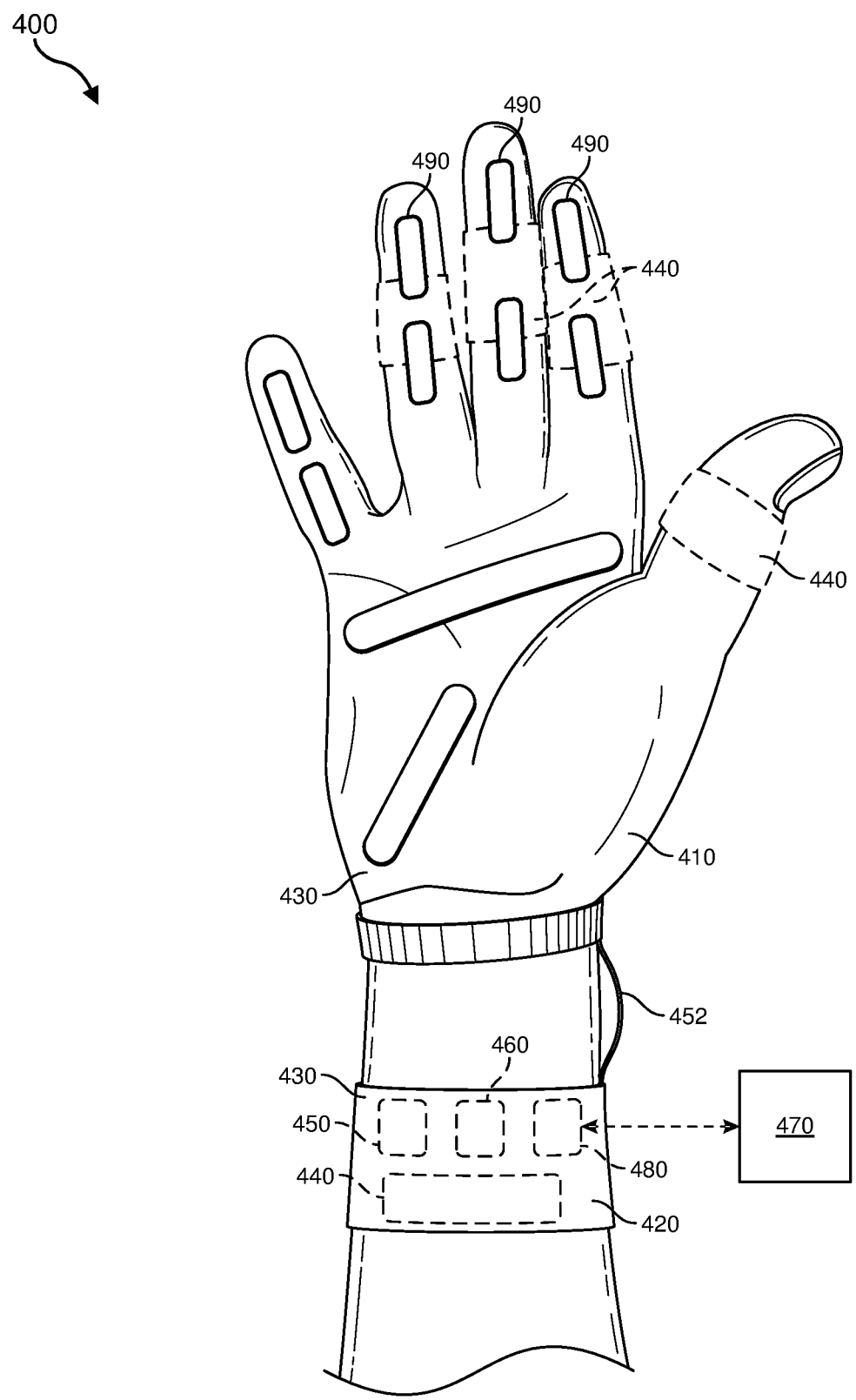
FIG. 4 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4 illustrates a vibrotactile system 400 in the form of a wearable glove (haptic device 410) and wristband (haptic device 420). Haptic device 410 and haptic device 420 are shown as examples of wearable devices that include a flexible, wearable textile material 430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 440 may be positioned at least partially within one or more corresponding pockets formed in textile material 430 of vibrotactile system 400. Vibrotactile devices 440 may be positioned in locations to provide a vibrating sensation (e.g., haptic feedback) to a user of vibrotactile system 400. For example, vibrotactile devices 440 may be positioned to be against the user's finger(s), thumb, or wrist, as shown in FIG. 4. Vibrotactile devices 440 may, in some examples, be sufficiently flexible to conform to or bend with the user's corresponding body part(s).

A power source 450 (e.g., a battery) for applying a voltage to the vibrotactile devices 440 for activation thereof may be electrically coupled to vibrotactile devices 440, such as via conductive wiring 452. In some examples, each of vibrotactile devices 440 may be independently electrically coupled to power source 450 for individual activation. In some embodiments, a processor 460 may be operatively coupled to power source 450 and configured (e.g., programmed) to control activation of vibrotactile devices 440.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 470. For example, vibrotactile system 400 may, in some examples, include a communications interface 480 for receiving and/or sending signals to the other device or system 470. The other device or system 470 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 480 may enable communications between vibrotactile system 400 and the other device or system 470 via a wireless (e.g., Wi-Fi, Bluetooth, cellular, radio, etc.) link or a wired link. If present, communications interface 480 may be in communication with processor 460, such as to provide a signal to processor 460 to activate or deactivate one or more of the vibrotactile devices 440.

Vibrotactile system 400 may optionally include other subsystems and components, such as touch-sensitive pads 490, pressure sensors, motion sensors, position sensors, lighting elements, and/or user interface elements (e.g., an on/off button, a vibration control element, etc.). During use, vibrotactile devices 440 may be configured to be activated for a variety of different reasons, such as in response to the user's interaction with user interface elements, a signal from the motion or position sensors, a signal from the touch-sensitive pads 490, a signal from the pressure sensors, a signal from the other device or system 470, etc.

Although power source 450, processor 460, and communications interface 480 are illustrated in FIG. 4 as being positioned in haptic device 420, the present disclosure is not so limited. For example, one or more of power source 450, processor 460, or communications interface 480 may be positioned within haptic device 410 or within another wearable textile.

Figure 5:
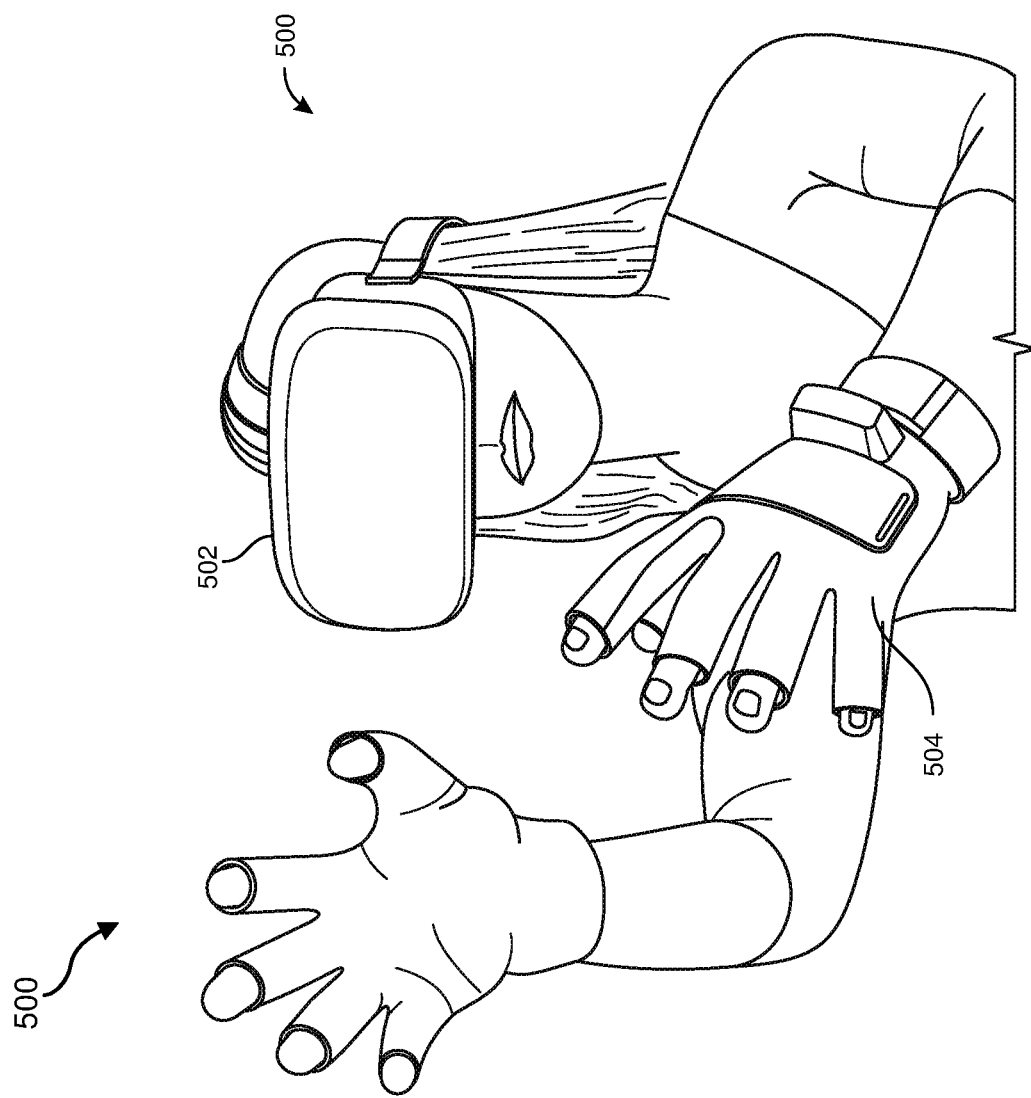
FIG. 5 is an illustration of an exemplary virtual-reality environment according to embodiments of this disclosure.

Haptic wearables, such as those shown in and described in connection with FIG. 4, may be implemented in a variety of types of artificial-reality systems and environments. FIG. 5 shows an example artificial reality environment 500 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 502 generally represents any type or form of virtual-reality system, such as virtual-reality system 300 in FIG. 3. Haptic device 504 generally represents any type or form of wearable device, worn by a use of an artificial reality system, that provides haptic feedback to the user to give the user the perception that he or she is physically engaging with a virtual object. In some embodiments, haptic device 504 may provide haptic feedback by applying vibration, motion, and/or force to the user. For example, haptic device 504 may limit or augment a user's movement. To give a specific example, haptic device 504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 504 to send action requests to a console. Examples of action requests include, without limitation, requests to start an application and/or end the application and/or requests to perform a particular action within the application.

Figure 6:
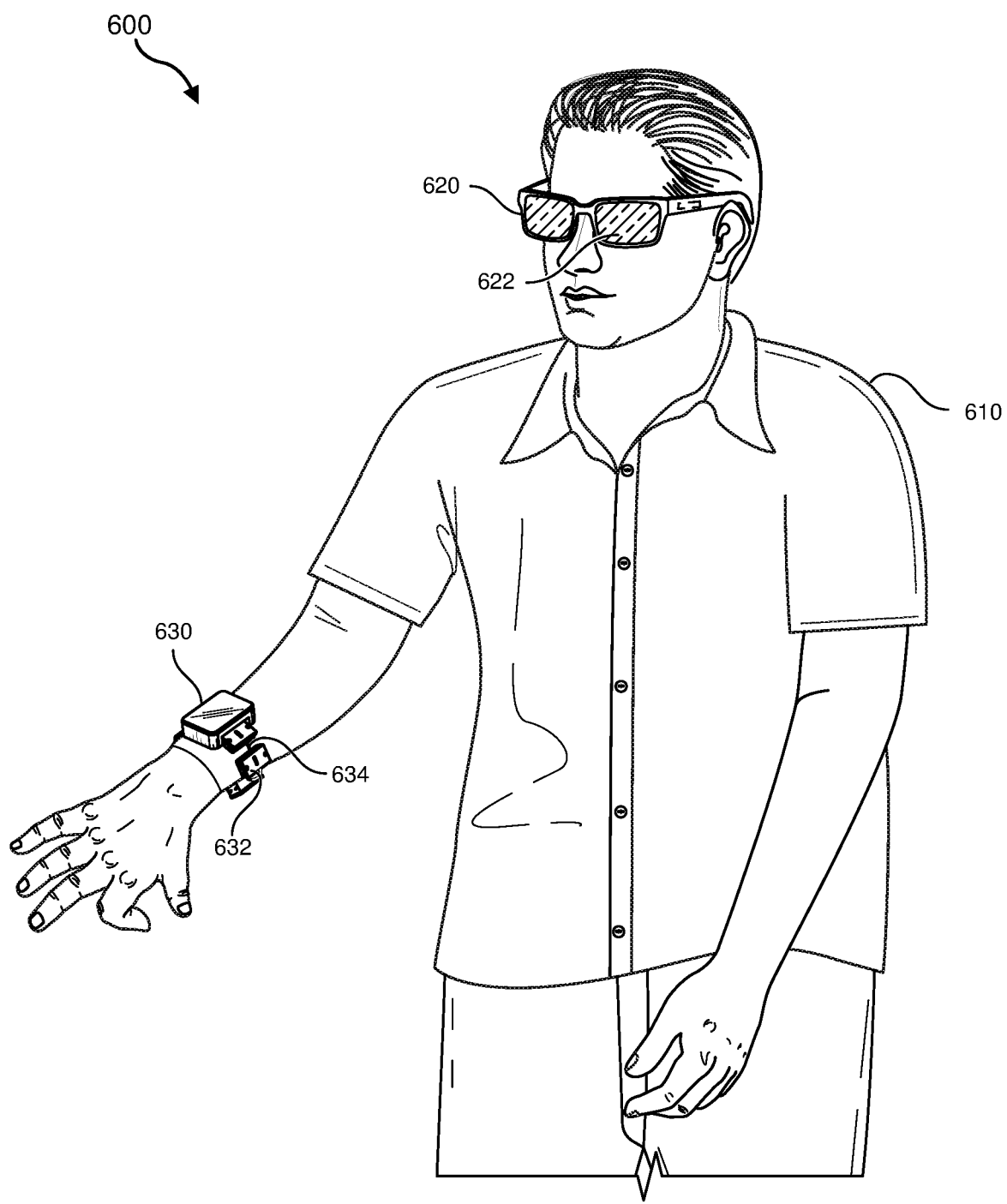
FIG. 6 is an illustration of an exemplary augmented-reality environment according to embodiments of this disclosure.

While haptic interfaces may be used with virtual-reality systems, as shown in FIG. 5, haptic interfaces may also be used with augmented-reality systems, as shown in FIG. 6. FIG. 6 is a perspective view a user 610 interacting with an augmented-reality system 600. In this example, user 610 may wear a pair of augmented-reality glasses 620 that have one or more displays 622 and that are paired with a haptic device 630. Haptic device 630 may be a wristband that includes a plurality of band elements 632 and a tensioning mechanism 634 that connects band elements 632 to one another.

One or more of band elements 632 may include any type or form of actuator suitable for providing haptic feedback. For example, one or more of band elements 632 may be configured to provide one or more of various types of cutaneous feedback, including vibration, force, traction, texture, and/or temperature. To provide such feedback, band elements 632 may include one or more of various types of actuators. In one example, each of band elements 632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 410, 420, 504, and 630 may include any suitable number and/or type of haptic transducer, sensor, and/or feedback mechanism. For example, haptic devices 410, 420, 504, and 630 may include one or more mechanical transducers, piezoelectric transducers, and/or fluidic transducers. Haptic devices 410, 420, 504, and 630 may also include various combinations of different types and forms of transducers that work together or independently to enhance a user's artificial-reality experience. In one example, each of band elements 632 of haptic device 630 may include a vibrotactor (e.g., a vibrotactile actuator) configured to vibrate in unison or independently to provide one or more of various types of haptic sensations to a user.

The artificial reality systems described above in connection with FIGS. 1-6 may facilitate and/or contribute to artificial reality experiences for users donning wearables that implement electric discharge-based sensing. As will be described in greater detail below in connection with FIGS. 7-17, such electric discharge-based sensing may provide users with a dynamic hands-free mechanism for detecting interactions (such as physical touch and release) between the users and their environments.

Figure 7:
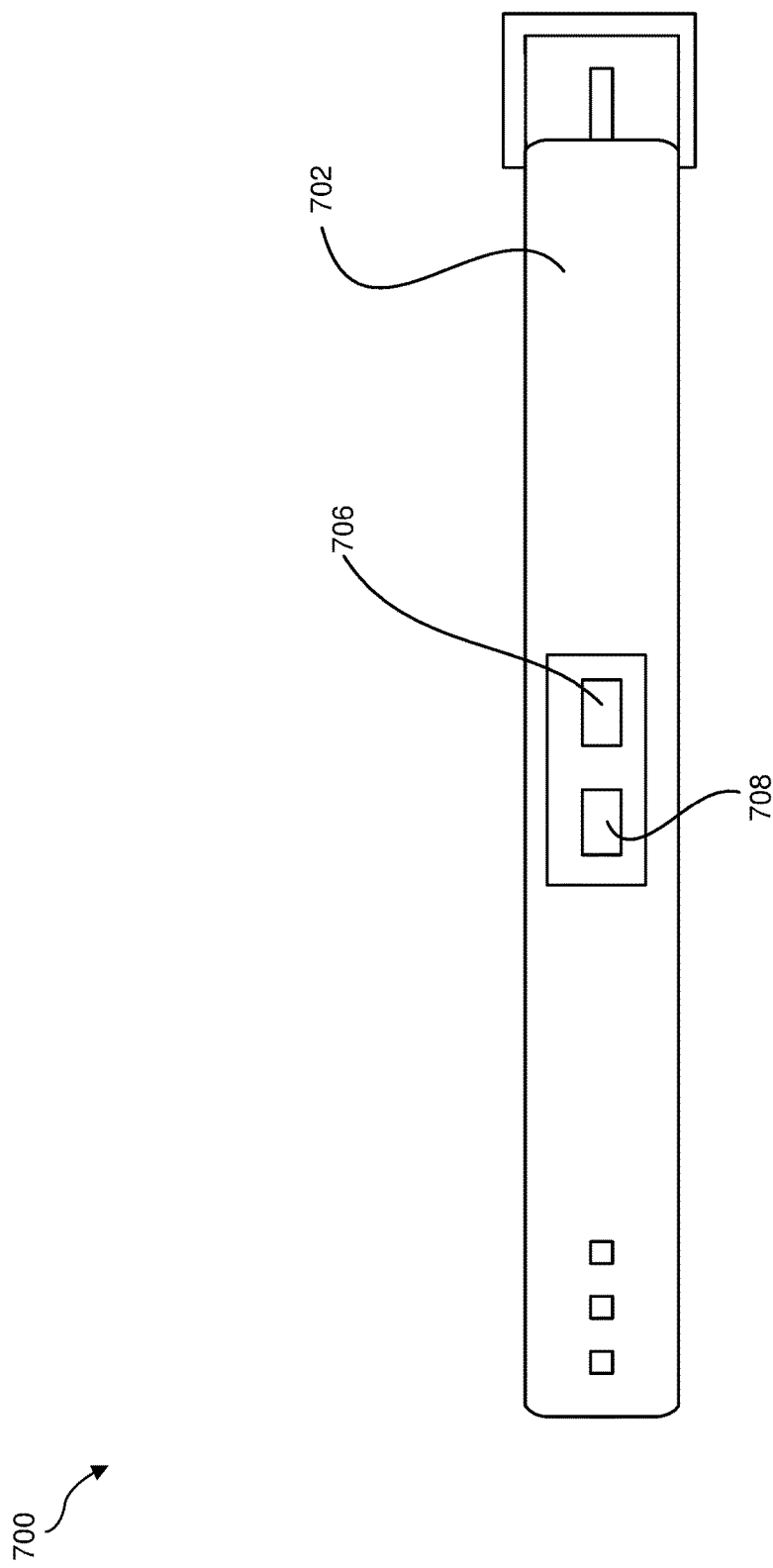
FIG. 7 illustrates an exemplary wearable that facilitates electric discharge-based sensing when donned by a user of an artificial reality system.

FIG. 7 is a block diagram of an exemplary wearable 700 that facilitates discharge-based sensing when donned by a user of an artificial reality system. As illustrated in this figure, exemplary wearable 700 may include an energy measuring device 706, a processing device 708, and a wristband 702. In one example, wearable 700 may be dimensioned to be donned and/or worn by a user of an artificial reality system. For example, a user may fasten wearable 700 to his or her wrist via wristband 702. The term "wearable," as used herein, generally refers to any type or form of computing device that is worn by a user as part of an article of clothing, an accessory, and/or an implant.

Energy measuring device 706 may include and/or represent an instrument that measures electrical energy differentials and/or exchanges between a user's body and a surface within the user's environment. For example, energy measuring device 706 may include and/or represent an electrometer (such as an electrostatic fieldmeter and/or an electrostatic voltmeter) that measures voltage levels and/or the amount of electric potential energy between a user's body and a surface within the user's environment. Additionally or alternatively, energy measuring device 706 may include and/or represent an electric current monitor and/or meter that measures the amount of electric current flowing between a user's body and a surface within the user's environment. Accordingly, the electrical energy monitored and/or measured by energy measuring device 706 may include and/or represent electric potential energy of hypothetical charges (also referred to as voltage), electric potential energy differences or variations in space for hypothetical charges (also referred to as electric field), and/or electric kinetic energy of hypothetical charges (also referred to as electric current).

In one example, the electrical energy differential measured by energy measuring device 706 may include and/or represent the electric potential between two reference points (such as a user and a surface within the user's environment). Additionally or alternatively, the electrical energy differential measured by energy measuring device 706 may include and/or represent the amount of electric charge and/or current flow transmitted and/or exchanged between two reference points (such as a user and a surface).

Processing device 708 may include and/or represent a hardware-implemented processing device capable of interpreting and/or executing computer-readable instructions. In one example, processing device 708 may obtain electrical signals representative of electrical energy differentials detected and/or measured by energy measuring device 706. Additionally or alternatively, processing device 708 may obtain computer-readable data representative of electrical energy differentials detected and/or measured by energy measuring device 706. Either way, processing device 708 may analyze the electrical energy differentials for evidence of any interactions between a user and a surface within the user's environment. Examples of such interactions include, without limitation, certain motions by the user in connection with and/or relative to the surface, spatial relationships between the user and the surface, distances travelled by the user over the surface, gestures and/or actions performed by the user in connection with and/or relative to the surface, the user's touching and/or releasing of the surface, combinations and/or variations of one or more of the same, and/or any other discernable interactions between the user and the surface.

In some examples, processing device 708 may detect an interaction between a user and a surface within the user's environment based at least in part on the electrical energy differential measured by energy measuring device 706. In response to detecting the interaction between the user and this surface within the user's environment, processing device 708 may generate an input command for the artificial reality system based at least in part on the interaction detected between the user and the surface. This input command may direct the artificial reality system to modify one or more virtual components presented and/or displayed to the user as part of his or her artificial reality experience.

Wristband 702 may include and/or represent a strap designed and/or dimensioned to at least partially encompass the wrist of a user of an artificial reality system. Wristband 702 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wristband 702 may be defined and/or formed in a variety of shapes and/or sizes with the aim of securing to the wrist of a user of an artificial reality system. In some examples, wristband 702 may be adjustable to provide a one-size-fits-most feature.

In addition to the various components illustrated in FIG. 7, exemplary wearable 700 may include one or more other components that are not illustrated and/or labelled in FIG. 7. For example, wearable 700 may include and/or incorporate batteries, electronic assemblies, communication interfaces or devices, body-charging devices, ionizers, step-up converters, and/or fasteners. An apparatus or system for electric discharge-based sensing may include and/or represent all or a portion of wearable 700 in FIG. 7. Accordingly, wearable 700 in FIG. 7 may, on its own, constitute and/or amount to an apparatus or system for electric discharge-based sensing.

Although exemplary wearable 700 includes the various components illustrated in FIG. 7, other embodiments of such wearables may omit and/or exclude one or more of those components. For example, an exemplary wearable may include energy measuring device 706 and wristband 702 but exclude processing device 708. In this example, instead of being incorporated into wearable 700, processing device 708 may be incorporated into a head-mounted display that is worn on a user's face and/or presents visual content to the user. Continuing with this example, processing device 708 incorporated into the head-mounted display may be communicatively coupled to energy measuring device 706 and/or a different processing device incorporated into wearable 700 via a wireless or wired communication interface.

In some examples, both wearable 700 and the head-mounted display may incorporate and/or include separate processing devices. In such examples, some of the processing described in connection with sensing physical contact, movement, and/or gestures herein may be performed by the processing device incorporated into wearable 700. Additionally or alternatively, some of the processing described in connection with sensing physical contact, movement, and/or gestures herein may be performed by the processing device incorporated into the head-mounted display. Accordingly, any of the processing described in connection with sensing physical contact, movement, and/or gestures may be performed at the wearable and/or the head-mounted display.

Figure 8:
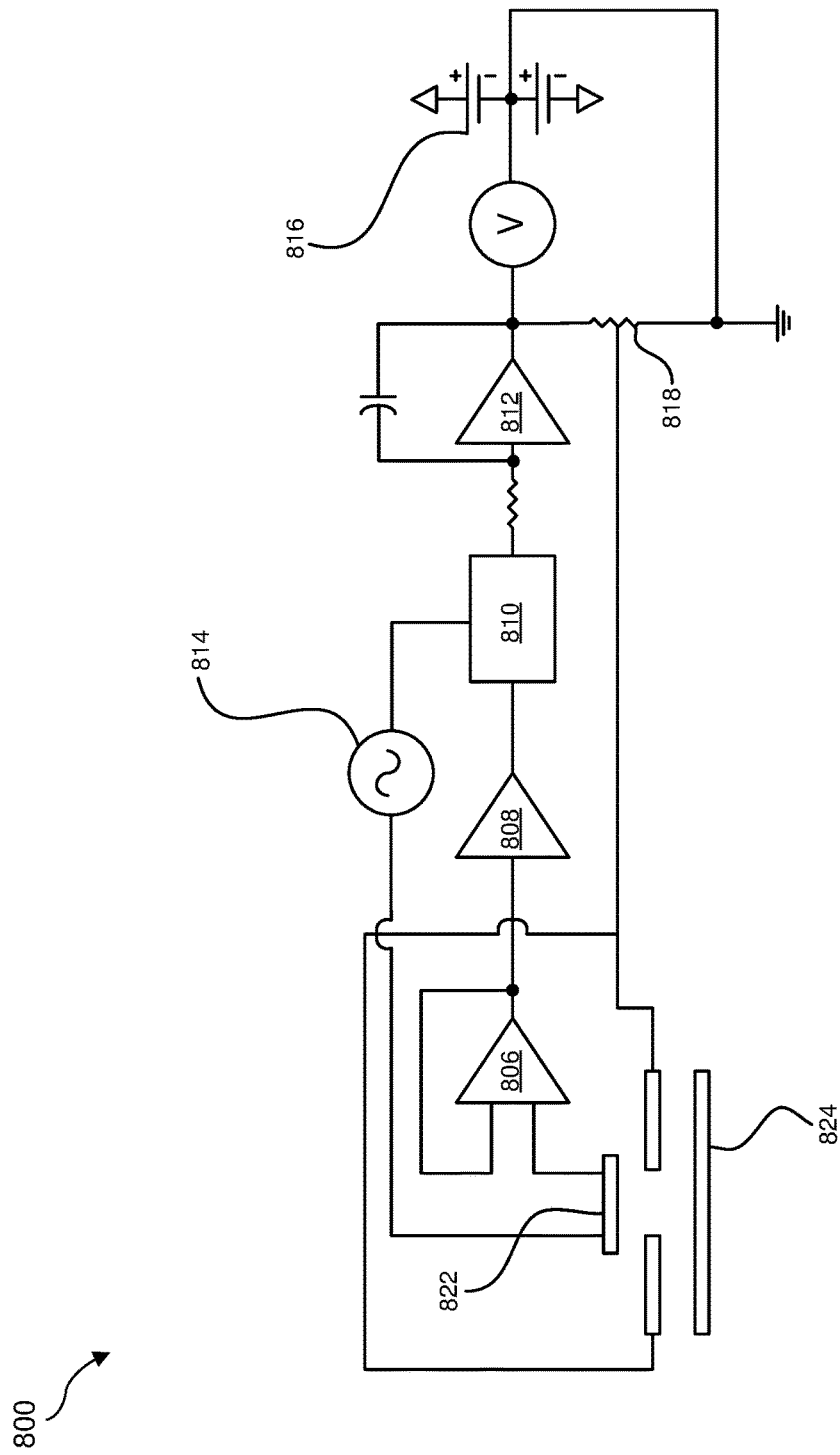
FIG. 8 illustrates a schematic of a circuit in an electrostatic fieldmeter that facilitates electric discharge-based sensing via wearables donned by users of artificial reality systems.

FIG. 8 is a circuit schematic of an exemplary electrostatic fieldmeter 800 that measures electric potential between a user and a surface within the user's environment. For example, electrostatic fieldmeter 800 may measure the amount of electrostatic charge and/or discharge of a user's body relative to a surface within the user's environment. In some examples, electrostatic fieldmeter 800 may be incorporated into wearable 700 in FIG. 7. Alternatively, electrostatic fieldmeter 800 may be incorporated into a different wearable donned by a user of an artificial reality system. In one example, the wearable that incorporates electrostatic fieldmeter 800 may couple and/or fasten to a user's body at a location other than the user's wrist.

As illustrated in FIG. 8, electrostatic fieldmeter 800 may include various components that facilitate electric potential-based sensing in connection with a user of an artificial reality system. For example, electrostatic fieldmeter 800 may include a vibrating plate 822, a surface 824, a preamplifier 806, an amplifier 808, a phase-sensitive demodulator 810, an integrator 812, a bootstrapped power supply 816, a potentiometer 818, and an oscillator 814. In this example, electrostatic fieldmeter 800 may measure the electrostatic charge and/or discharge of surface 824. Additionally or alternatively, electrostatic fieldmeter 800 may measure the electric potential between surface 824 and a ground reference. Accordingly, surface 824 may be subjected to testing and/or energy measurements.

In one example, electrostatic fieldmeter 800 may be electrically grounded to the body of a user and/or measure the electric potential between the user's body and surface 824. Additionally or alternatively, electrostatic fieldmeter 800 may be electrically grounded to surface 824 and/or measure the electric potential between the user's body and surface 824. Accordingly, electrostatic fieldmeter 800 may be electrically grounded to the user's environment by an electrode (e.g., worn on the user's shoe sole and/or run via a cable to the user's headset or another wearable device).

Electrostatic fieldmeter 800 may be grounded to the user's body in a variety of ways. In some examples, electrostatic fieldmeter 800 may be grounded to one point on the body (e.g., the user's leg or shoulder) and then measure the electrostatic charge at another point on the body (e.g., the user's wrist or fingertip). In other examples, electrostatic fieldmeter 800 may be grounded to one point on the body and have an aperture pointed away from the body with no specific target. By doing so, electrostatic fieldmeter 800 may measure an integral of electric potentials, which are weighted by their distance from electrostatic fieldmeter 800, in the user's environment. Additionally or alternatively, electrostatic fieldmeter 800 may be grounded to one point on the user's body and then specifically target another point at a known or estimated position.

In some examples, electrostatic fieldmeter 800 may measure the electrostatic charge of various objects and/or surfaces. In such examples, electrostatic fieldmeter 800 may cause and/or facilitate the flow of charge to and/or from vibrating plate 822. In one example, electrostatic fieldmeter 800 may be able to measure the electric potential between a user's body and a surface within the user's environment even though electrostatic fieldmeter 800 does not make any direct contact with that surface itself.

In some examples, the charge of a user's body may need to be replenished and/or maintained in order to measure and/or detect certain discharges with respect to a surface within the user's environment. To facilitate such replenishing and/or maintenance of the body's charge, the user may couple, apply, and/or install a body-charging device to his or her body. This body-charging device may charge the user's body relative to the surface within the user's environment. This body-charging device may be incorporated into wearable 700 in FIG. 7 or a different wearable.

In one example, processing device 708 may analyze the electric potential measured between the user and the surface. In this example, processing device 708 may determine that the user has touched and/or released the surface based at least in part on the analysis of the electric potential measured between the user and the surface.

Figure 9:
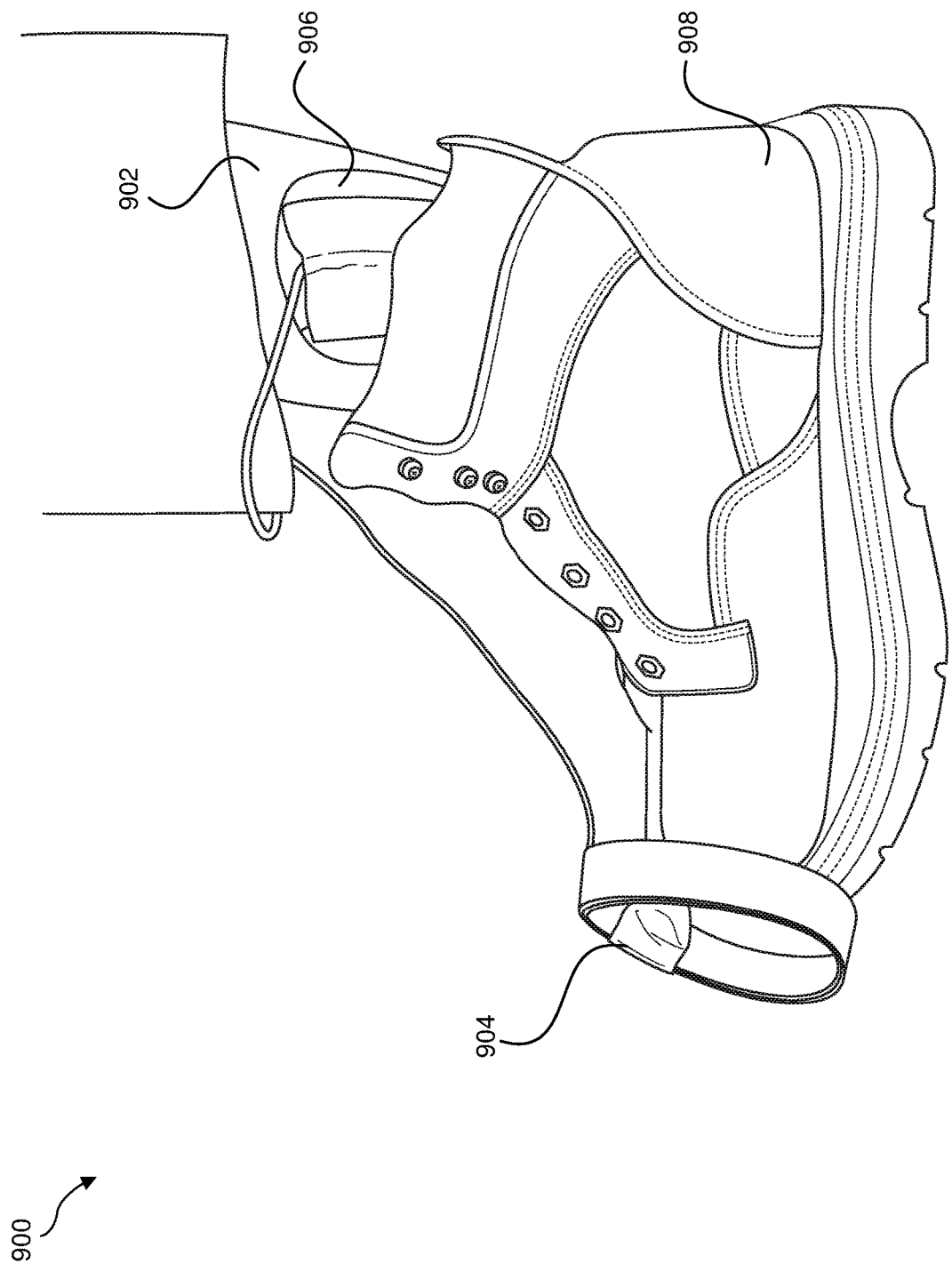
FIG. 9 is an illustration of a body-charging device donned by a user of an artificial reality system.
Figure 10:
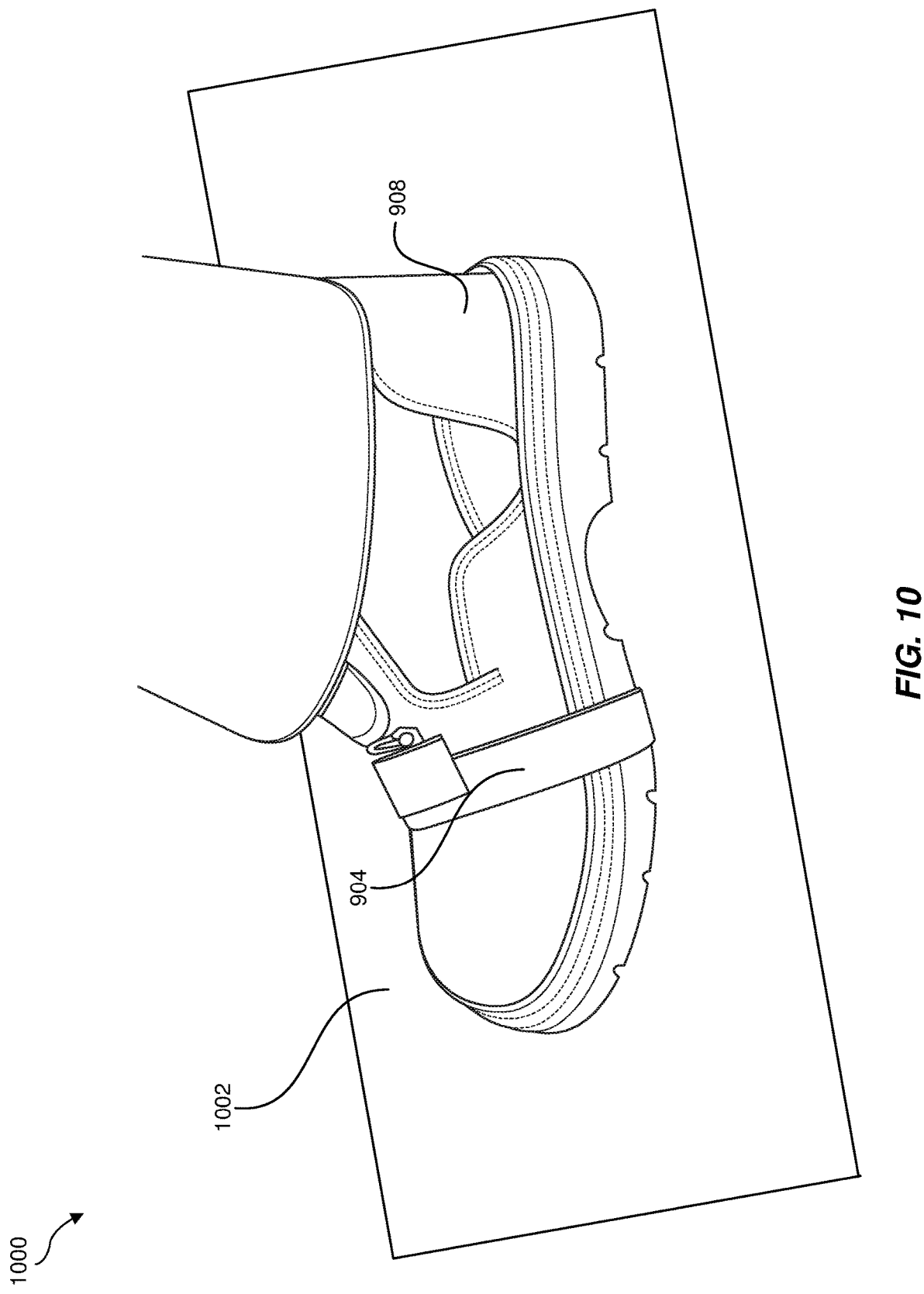
FIG. 10 is an illustration of a body-charging device donned by a user of an artificial reality system.

FIGS. 9 and 10 are illustrations of an exemplary body-charging device 900 applied to and/or installed on a user's body. As illustrated in FIG. 9, body-charging device 900 may include a charging electrode 906 that is electrically coupled to the body of a user 902. In addition, body-charging device 900 may include a grounding electrode 904 that is mounted to a shoe 908 of the user. In some examples, grounding electrode 904 may establish an electrical reference to a surface 1002 in FIG. 10 within the user's environment. For example, as the user stands on surface 1002, grounding electrode 1204 may be electrically coupled to surface 1002 via shoe 908, thereby grounding body-charging device 900 to surface 1002. In one example, surface 1002 may include and/or represent a floor and/or carpet on which the user is standing while operating the artificial reality system. Additionally or alternatively, surface 1002 may include and/or represent an object and/or pad within the environment where the user is operating the artificial reality system.

In some examples, body-charging device 900 may include and/or represent an ionizer (e.g., a commodity air ionizer) that ionizes the air around the user via a high-voltage output. By ionizing the air around the user in this way, body-charging device 900 may indirectly charge the body of user 902. In one example, body-charging device 900 may include a high negative voltage source (e.g., −100 volts) with high source impedance (e.g., 10 megaohms). In this example, body-charging device 900 may negatively charge the body of user 902 with respect to surface 1002. Additionally or alternatively, body-charging device 900 may include and/or represent a step-up and/or boost converter that creates a high voltage for charging the user's body.

In some examples, the user's body may serve as an organic medium at which charge is stored and/or accumulated. The user's body may include organic matter capable of carrying, storing, and/or releasing an electrostatic charge.

In some examples, body-charging device 900 may represent a stand-alone wearable. In one example, body-charging device 900 may work in conjunction with wearable 700 in FIG. 7 to facilitate electric discharge-based sensing. Additionally or alternatively, certain components (e.g., energy measuring device 706 and/or a processing device 708) illustrated as part of wearable 700 in FIG. 7 may be incorporated in body-charging device 900 such that no other wearables are necessary to achieve electric discharge-based sensing. Although not illustrated in this way in FIGS. 9 and 10, one or more components of body-charging device 900 may be incorporated into wearable 700 in FIG. 7 such that body-charging device 900 and wearable 700 form a single integrated unit.

In some examples, energy measuring device 706 may measure and/or monitor the electrostatic charge of a user's body relative to a surface within the user's environment. In one example, processing device 708 may detect an interaction between the user and the surface within the environment based at least in part on the electrostatic charge of the user's body as measured by energy measuring device 706. For example, processing device 708 may determine that the user has touched the surface by detecting evidence of electrostatic discharge via energy measuring device 706. Additionally or alternatively, processing device 708 may determine that the user has released the surface by detecting evidence of electrostatic recharge via energy measuring device 706.

Electrostatic charge and/or discharge may originate from and/or be caused by a variety of identifiable and/or discernable gestures and/or physical contact made by a user. In one example, electrostatic charge and/or discharge may be caused and/or produced by the user touching and/or tapping a surface within the user's environment. In another example, electrostatic charge and/or discharge may be caused and/or produced by a hand gesture made by the user. In a further example, electrostatic charge and/or discharge may be caused and/or produced by the user touching and/or releasing an object and/or surface within the environment with a body part (e.g., touching the user's right index finger against a surface). In an additional example, electrostatic charge and/or discharge may be caused and/or produced by the user releasing the object and/or surface within the environment with the body part (e.g., lifting the user's right index finger off the surface). Electrostatic charge and/or discharge may also be caused and/or produced by the user walking and/or sliding his or her feet across a floor and/or mat within the environment.

In some examples, when the user remains motionless, energy measuring device 706 may detect and/or sense little or no change in the amount of charge stored by the user's body. In such examples, energy measuring device 706 may produce and/or provide a baseline reading in the absence of change in the amount of charge and/or discharge stored by the user's body. For example, when the user remains motionless, no meaningful change in the amount of charge may be caused and/or detected at wearable 700. Without detecting and/or sensing such a change in the body's charge, energy measuring device 706 may produce and/or provide an output that accounts for the lack of such a change. This output may demonstrate the absence of such a change in the body's charge. Accordingly, this output produced by energy measuring device 706 may indicate and/or be used to determine that no gesture and/or movement has been made by the user donning wearable 700.

In some examples, processing device 708 may monitor the charge of the user's body for changes, variations, and deviations via the output of energy measuring device 706. In some examples, processing device 708 may determine that certain changes, variations, and/or deviations detected in the output of energy measuring device 706 are indicative of a certain interaction between the user and the surface within the environment. As a specific example, processing device 708 may detect one or more oscillations, dampenings, and/or rebounds in the output of energy measuring device 706. Processing device 708 may then determine that the oscillations, dampenings, and/or rebounds in the output of energy measuring device 706 indicate that the user has touched and/or released a certain surface within the user's environment. Additionally or alternatively, processing device 708 may implement and/or apply machine learning algorithms to detect and/or distinguish interaction-specific electrical energy differentials from unmeaningful electrical energy differentials.

In some examples, the output of energy measuring device 706 may be coupled with data from other sensors to facilitate the detection of certain interactions between the user and the surface within the environment. To improve the accuracy of interaction detection and/or identification by wearable 700, processing device 708 may rely on telemetry data gathered from various sensors, including energy measuring device 706, aboard wearable 700 and/or incorporated elsewhere in the artificial reality system. In other words, processing device 708 may collect telemetry data from energy measuring device 706 and one or more additional sensors and then determine that the user had a certain interaction with the surface based at least in part on such telemetry data. Examples of such sensors include, without limitation, vibrations sensors, accelerometers, IMUS, gyroscopes, electromyography (EMG) sensors, cameras, directional acoustic sensors, combinations or variations of one or more of the same, and/or any other suitable sensors.

In response to determining that the user had the interaction with the surface, processing device 708 may generate an input command for the artificial reality system based at least in part on that interaction. In some examples, processing device 708 may facilitate modifying at least one virtual component of the artificial reality system to account for the interaction. Processing device 708 may facilitate such modifications in a variety of different ways and contexts. For example, processing device 708 may send a message to a head-mounted display worn by the user of the artificial reality system. Examples of this message include, without limitation, commands, computer-readable instructions, information and/or data indicative of the interaction between the user and the surface, combinations or variations of one or more of the same, and/or any other suitable message.

In some examples, the head-mounted display may then modify the user's artificial reality experience and/or visualization to account for the interaction between the user and the surface. For example, the interaction may signify and/or correspond to the pressing and/or selection of a button within the user's artificial reality experience. In this example, the head-mounted display may generate and/or modify certain graphics or image frames for presentation to the user. These graphics or image frames may take into account that the user has pressed and/or selected the button within the user's artificial reality experience.

As another example, the interaction may signify and/or correspond to the touching of a certain surface within the user's artificial reality experience. In this example, the head-mounted display may generate and/or modify certain graphics or image frames for presentation to the user. These graphics or image frames may show the user touching that surface within the user's artificial reality experience.

In other examples, processing device 708 may store the input command in connection with the artificial reality system without necessarily modifying a virtual component of the artificial reality system. For example, processing device 708 may store a tag and/or metadata for the artificial reality system in response to the interaction between the user and the surface. In this example, the tag and/or metadata may not necessarily modify any virtual components of the artificial reality system.

Figure 11:
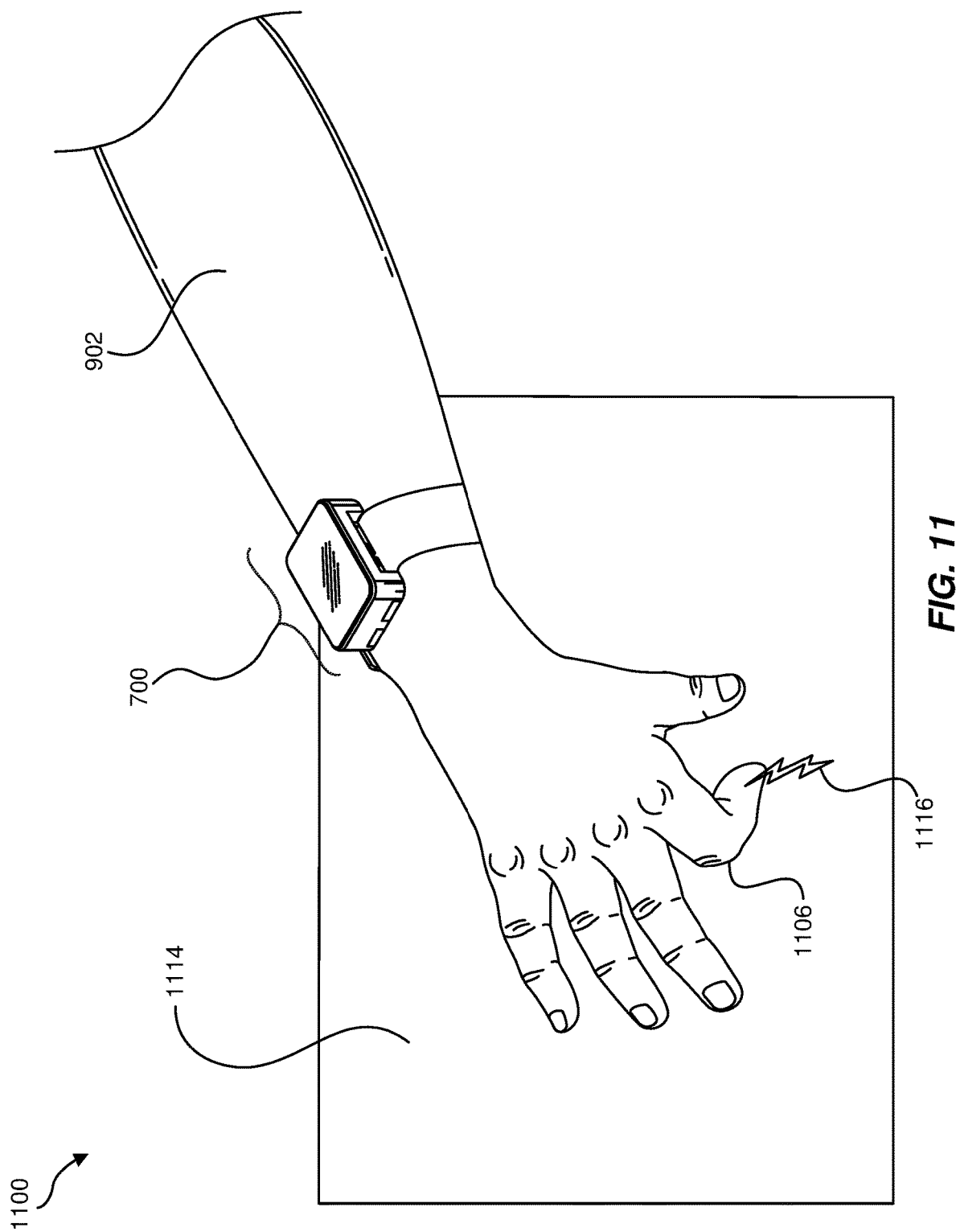
FIG. 11 is an illustration in which a user donning an exemplary wearable makes physical contact with an object.

FIG. 11 is an illustration of an exemplary implementation 1100 in which a user 902 donning wearable 700 taps his or her index finger 1106 against a surface 1114. As illustrated in FIG. 11, user 902 may don wearable 700 on the wrist of his or her right arm. In some examples, the user may calibrate wearable 700 to that position on his or her wrist. In one example, the user may perform this calibration mechanically by altering and/or moving the orientation of wearable 700. Additionally or alternatively, wearable 700 may perform a form of self-calibration by way of automated electrical and/or mechanical processes designed to customize, tailor, and/or personalize energy measuring device 706 to the individual user.

As illustrated in FIG. 11, the tapping of index finger 1106 may generate and/or produce an electric discharge 1116 due at least in part to an electrical energy differential between user 902 and surface 1114. In this example, electric discharge 1116 may be transmitted from user 902 and to surface 1114.

In some examples, energy measuring device 706 may be positioned within wearable 700 such that energy measuring device 706 presses against and/or touches the skin and/or bone of user 902. In one example, energy measuring device 706 may be positioned proximate to and/or interface directly with the skin surface of the user within wristband 702.

In some examples, energy measuring device 706 may produce one or more outputs that are commensurate to the energy-based reading at any given time. Accordingly, the outputs produced by energy measuring device 706 may indicate when user 902 makes a certain gesture and/or interaction based on one or more the changes, variations, and deviations in the energy measured at wearable 700 exhibited. For example, measurements taken by energy measuring device 706 may indicate and/or exhibit certain changes in the charge stored by the user's body and/or the electric current flowing between the user's body and the surface. In one example, a dampening and/or spike in the charge-based reading may indicate and/or suggest that user 902 has touched surface 1114. Additionally or alternatively, a dampening and/or spike in the charge-based reading may indicate and/or suggest that user 902 has released surface 1114. The meaning and/or significance of these indicators (e.g., dampenings and/or spikes) with respect to the interactions between user 902 and surface 1114 may vary depending on the configuration and/or design of energy measuring device 706.

Figure 12:
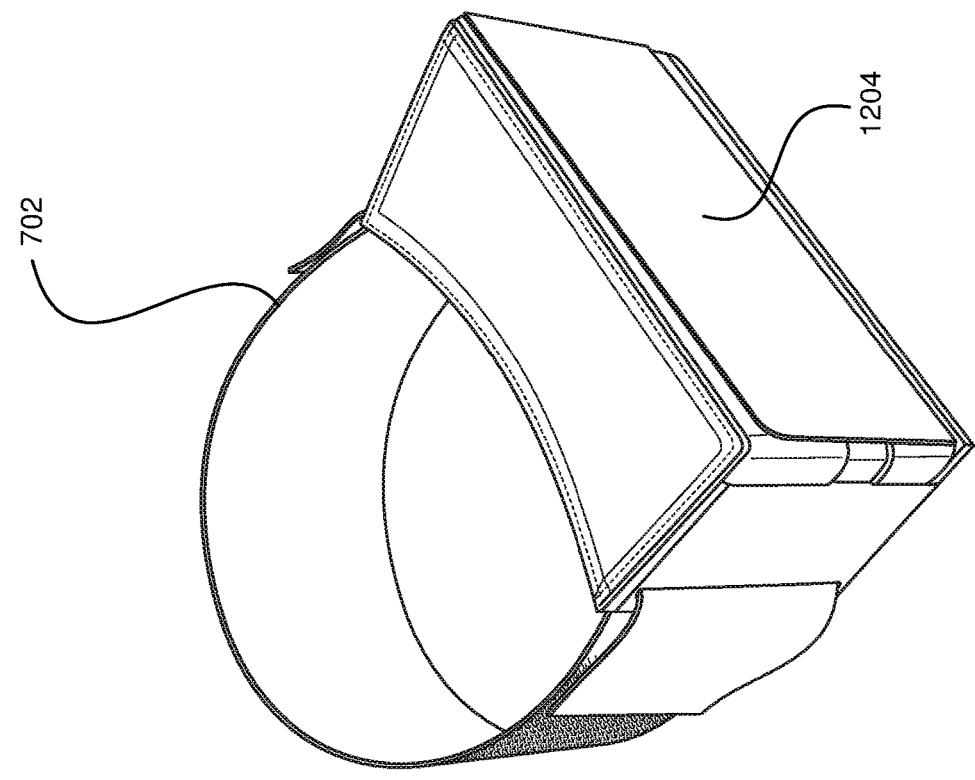
FIG. 12 is an illustration of an exemplary wearable that facilitates electric discharge-based sensing when donned by a user of an artificial reality system.
Figure 13:
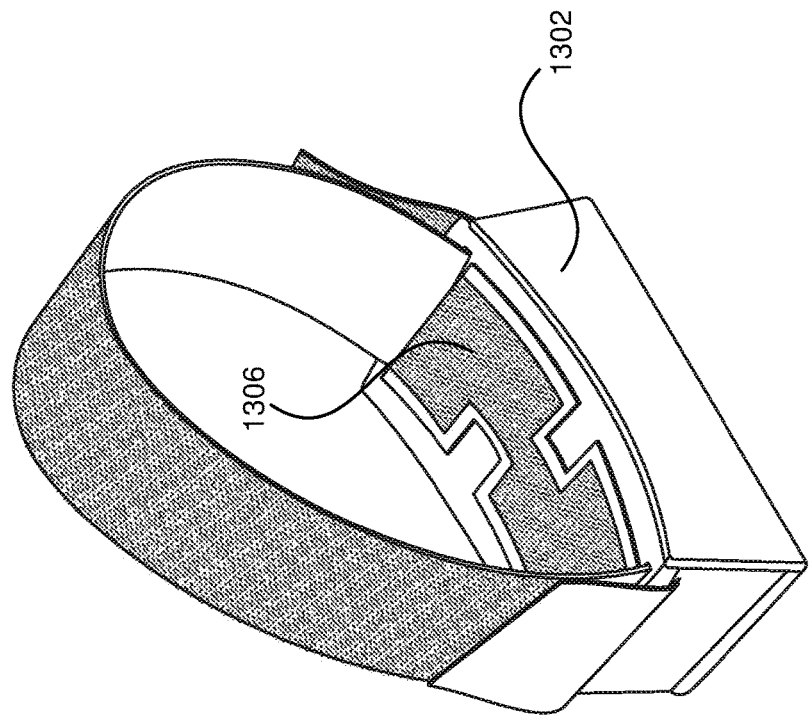
FIG. 13 is an additional illustration of an exemplary wearable that facilitates electric discharge-based sensing when donned by a user of an artificial reality system.

FIGS. 12 and 13 are illustrations of exemplary wearable 1200 that facilitates discharge-based sensing when donned by a user of an artificial reality system. Although not necessarily illustrated in this way in FIGS. 12 and 13, exemplary wearable 1200 may include energy measuring device 706, processing device 708, and wristband 702. In some examples, wearable 1200 may be dimensioned to be donned and/or worn by a user of an artificial reality system.

In some examples, wearable 1200 may include and/or incorporate a surface-charging device 1302 designed to charge a surface within a user's environment. For example, surface-charging device 1302 may include and/or represent an ionizer that ionizes the air around the surface, which in turn indirectly charges the surface. In such examples, wearable 1200 may also include and/or incorporate a surface-charging electrode 1204 that facilitates electrically coupling surface-charging device 1302 to the surface. In one example, surface-charging electrode 1204 may be directed and/or pointed toward the air, as opposed to the surface, to facilitate air ionization.

In other examples, surface-charging device 1302 may include and/or represent a step-up or boost converter that charges the surface directly via a high-voltage output. In these examples, surface-charging electrode 1204 may be designed to make physical contact with the surface to facilitate the direct charging of the surface.

In one example, the user may fasten wearable 1200 around his or her right wrist. In this example, when the user places surface-charging electrode 1204 against the surface, surface-charging electrode 1204 may electrically couple surface-charging device 1302 to the surface. By doing so, surface-charging device 1302 may be able to charge the surface within the user's environment from the user's right wrist via surface-charging electrode 1204.

In addition, wearable 1200 may include and/or incorporate a skin-touching electrode 1306 that facilitates electrically coupling the surface to energy measuring device 706.

Continuing with this example, because the surface has been charged by surface-charging device 1302 via surface-charging electrode 1204, there may be a certain electrical energy differential between the user and the surface. As a result, when the user touches the surface with a finger on his or her left or right hand, the charge stored on the surface may transfer to the user's body in the form of electric current via that finger.

As the electric current reaches wearable 1200 on the user's wrist, energy measuring device 706 may measure the amount of electric current flowing from the surface to the user's body. Energy measuring device 706 may measure the electric current at a variety of different points. For example, energy measuring device 706 may measure the electric current at the reference point, the output point, and/or the device's power source.

In one example, processing device 708 may analyze the amount of electric current measured by energy measuring device 706. In this example, processing device 708 may determine that the user has touched and/or released the surface based at least in part on the analysis of the electric current measured by energy measuring device 706.

Figure 14:
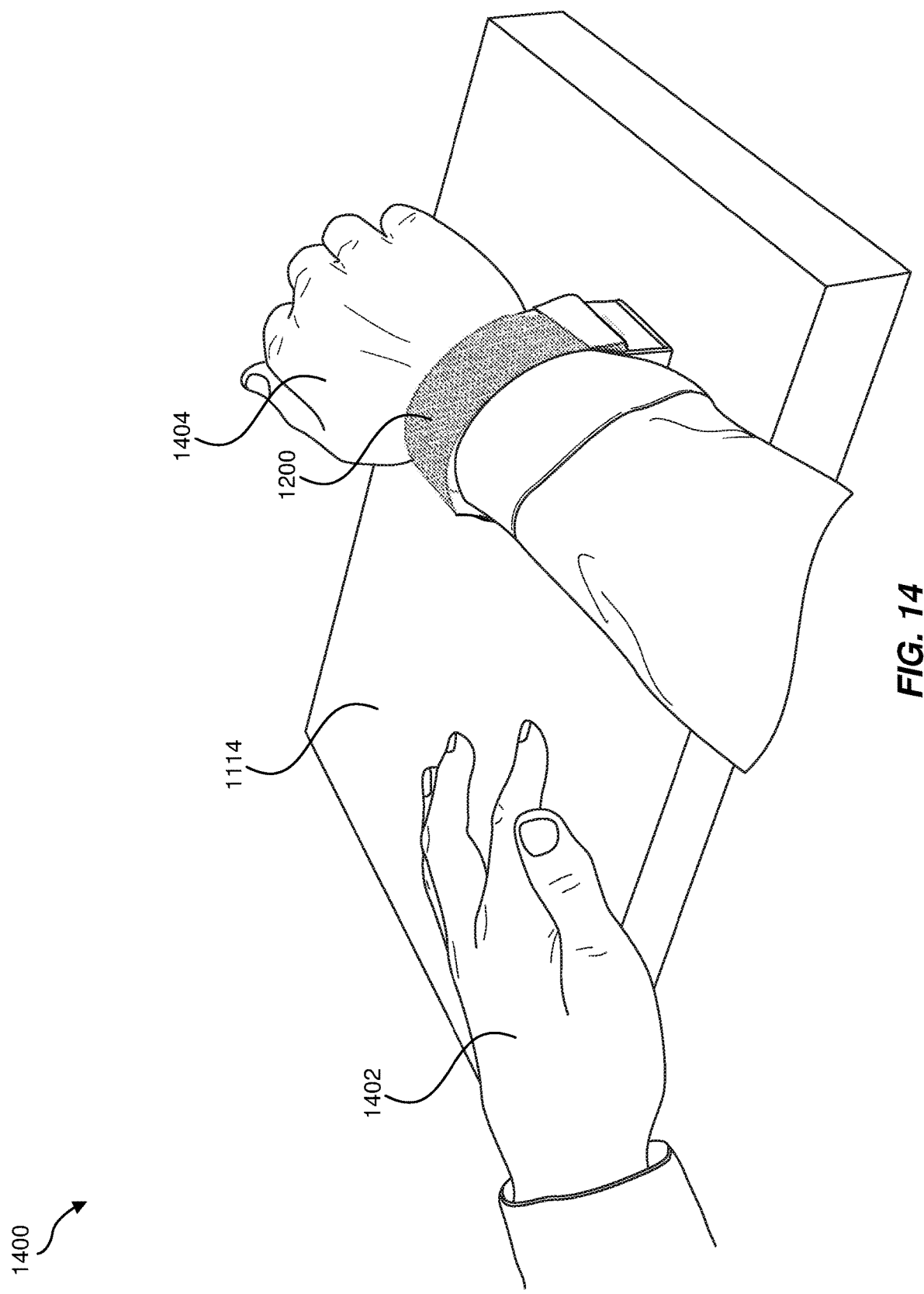
FIG. 14 is an illustration in which a user donning an exemplary wearable makes physical contact with a surface.

FIG. 14 is an illustration of an exemplary implementation 1400 in which a user donning wearable 1200 makes physical contact with surface 1114. As illustrated in FIG. 14, the user may place a surface-charging electrode of wearable 1200 against surface 1114. In one example, a surface-charging device included on wearable 1200 may charge surface 1114 relative to the body of the user. When the user touches surface 1114 with the index finger on his or her left hand, the charge stored on surface 1114 may transfer to the user's body in the form of electric current via that index finger on his or her left hand. As the electric current reaches wearable 1200 on the user's wrist, energy measuring device 706 may measure the amount of electric current flowing from the surface to the user's body.

Additionally or alternatively, when the user touches surface 1114 with the index finger on his or her left hand, the charge stored on the user's body and the charge stored on surface 1114 may equalize. In other words, surface 1114 may discharge to the user's body. As the charge transfers from surface 1114 to the user's body, energy measuring device 706 may measure the amount of charge on the user's body relative to surface 1114.

In one example, processing device 708 may analyze the amount of charge measured by energy measuring device 706. In this example, processing device 708 may determine that the user has touched and/or released surface 1114 based at least in part on the analysis of the charge measured by energy measuring device 706.

FIG. 15 is an illustration of a user making physical contact with surface 1114 while donning wearable 700, and FIG. 16 is an illustration of an exemplary representation 1600 of an output 1610 produced by energy measuring device 706 as the user makes the physical contact depicted in FIG. 15. As illustrated in FIG. 15, the user may touch surface 1114 with index finger 1106. In one example, energy measuring device 706 incorporated in wearable 700 may measure an electrical energy differential between the body of the user and surface 1114. In this example, energy measuring device 706 may generate and/or produce output 1610.

As illustrated in FIG. 16, exemplary representation 1600 may depict output 1610 that overlays a reference graph consisting of an x-axis 1604 and a y-axis 1602. In one example, x-axis 1604 may correspond to and/or represent time. In this example, y-axis 1602 may correspond to and/or represent voltage. Accordingly, output 1610 may constitute a voltage level that is commensurate to the measurement of the electrical energy differential taken by energy measuring device 706 over a certain period of time.

As illustrated in FIG. 16, exemplary representation 1600 may also include a time marker 1606 that marks and/or identifies the point in time at which the user illustrated in FIG. 15 makes physical contact with surface 1114. As the user makes physical contact with surface 1114, output 1610 may experience and/or exhibit a dampening 1612. Accordingly, dampening 1612 may indicate and/or be used to determine that the user has touched some kind of surface (e.g., surface 1114).

In addition, exemplary representation 1600 may include a time marker 1608 that marks and/or identifies the point in time at which the user illustrated in FIG. 16 releases surface 1114 such that index finger 1106 is no longer touching surface 1114. As the user releases surface 1114, output 1610 may experience and/or exhibit a rebound 1614. Accordingly, rebound 1614 may indicate and/or be used to determine that the user has released surface 1114.

In some examples, processing device 708 may monitor the electrical energy differential based at least in part on the output of energy measuring device 706. For example, the output of energy measuring device 706 may be commensurate with and/or represent the level of charge and/or current measured at wearable 700. In this example, processing device 708 may monitor such charge and/or current for changes, variations, and deviations via the output of energy measuring device 706.

In some examples, wearable 700 and/or the head-mounted display may implement one or more machine learning algorithms and/or models to facilitate the detection, identification, and/or classification of certain touching and/or releasing done by the user. For example, wearable 700 and/or the head-mounted display may be programmed and/or configured with a fully and/or partially constructed machine learning model (such as a convolutional neural network and/or a recurrent neural network). In one example, wearable 700 and/or the head-mounted display may include and/or incorporate a storage device that stores the machine learning model. The machine learning model may be trained and/or constructed with training data that includes various samples of electrical energy differentials detected by energy measuring devices.

Some of these samples may represent and/or be indicative of a user touching a surface with a specific body part and/or releasing the surface with that body part. These samples may constitute positive data for the purpose of training the machine learning model. Other samples may represent and/or be indicative of a user neither touching nor releasing a surface with that body part. These other samples may constitute negative data for the purpose of training the machine learning model.

In some examples, one or more of these samples may be supplied by a pool of indiscriminate users whose data is collected by the manufacturer of wearable 700 for the purpose of training the machine learning model. In one example, one or more of these samples may also be supplied by the end user donning wearable 700 and/or operating the artificial reality system. For example, the user may calibrate and/or train the machine learning model implemented on wearable 700 to recognize his or her rendition of touching and/or releasing (because one person's rendition of touching and/or releasing may cause a different discharge signature and/or profile than another's). To do so, the user may perform one or more instances of touching and/or releasing a surface with a specific body part, thereby generating one or more electrical energy differentials. These electrical energy differentials may represent and/or serve as samples of the user's rendition of such touching and/or releasing.

Continuing with this example, processing device 708 may capture those samples of the electrical energy differentials measured by energy measuring device 706 while the user performs touching and/or releasing with a specific body part. Processing device 708 may then calibrate the machine learning model to recognize such touching and/or releasing as performed by the user.

Upon training and/or calibrating the machine learning model, processing device 708 may be able to classify electrical energy differentials measured by energy measuring device 706 as touching, releasing, and/or neither touching nor releasing via the machine learning model. In other words, the machine learning model may indicate and/or determine whether any electrical energy differentials detected at wearable 700 are meant by the user to communicate a touch- and/or release-based command and/or instruction to the artificial reality system. In one example, processing device 708 may receive an output that represents and/or accounts for an electrical energy differential from energy measuring device 706. In this example, processing device 708 may analyze, classify, and/or process the output from energy measuring device 706 via the machine learning model.

In some examples, processing device 708 may detect, within the electrical energy differential via the machine learning model, a pattern indicative of the user's body making physical contact with a surface. In such examples, processing device 708 may then determine that the user's body has made physical contact with a surface based at least in part on the pattern detected within the electrical energy differential via the machine learning model.

As a specific example, the machine learning model may represent a convolutional neural network that includes various layers, such as one or more convolution layers, activation layers, pooling layers, and fully connected layers. In this example, the electrical response may include and/or represent the most recent 100 milliseconds of electrical energy differential data outputted by energy measuring device 706. Processing device 708 may pass the electrical energy differential data through the convolutional neural network to classify the electrical energy differential data as touching, releasing, and/or neither of the two.

In the convolutional neural network, the electrical energy differential data may first encounter the convolution layer. At the convolution layer, the 100 milliseconds of electrical energy differential data may be convolved using a filter and/or kernel. In particular, the convolution layer may cause processing device 708 to slide a matrix function window over and/or across the 100 milliseconds of electrical energy differential data. Processing device 708 may then record the resulting data convolved by the filter and/or kernel. In one example, one or more nodes included in the filter and/or kernel may be weighted by a certain magnitude and/or value.

After completion of the convolution layer, the convolved representation of the electrical energy differential data may encounter the activation layer. At the activation layer, the convolved electrical energy differential data may be subjected to a non-linear activation function. In one example, the activation layer may cause processing device 708 to apply the non-linear activation function to the convolved electrical energy differential data. By doing so, processing device 708 may be able to identify and/or learn certain non-linear patterns, correlations, and/or relationships between different regions of the convolved electrical energy differential data.

In some examples, processing device 708 may apply one or more of these layers included in the convolutional neural network to the electrical energy differential data multiple times. As the electrical energy differential data completes all the layers, the convolutional neural network may render a classification for the electrical energy differential data. In one example, the classification may indicate that the electrical energy differential data is indicative of the user touching a surface. In another example, the classification may indicate that that the electrical energy differential data is indicative of the user releasing a surface. Additionally or alternatively, the classification may indicate that that the electrical energy differential data is indicative of the user neither touching nor releasing a surface.

Figure 17:
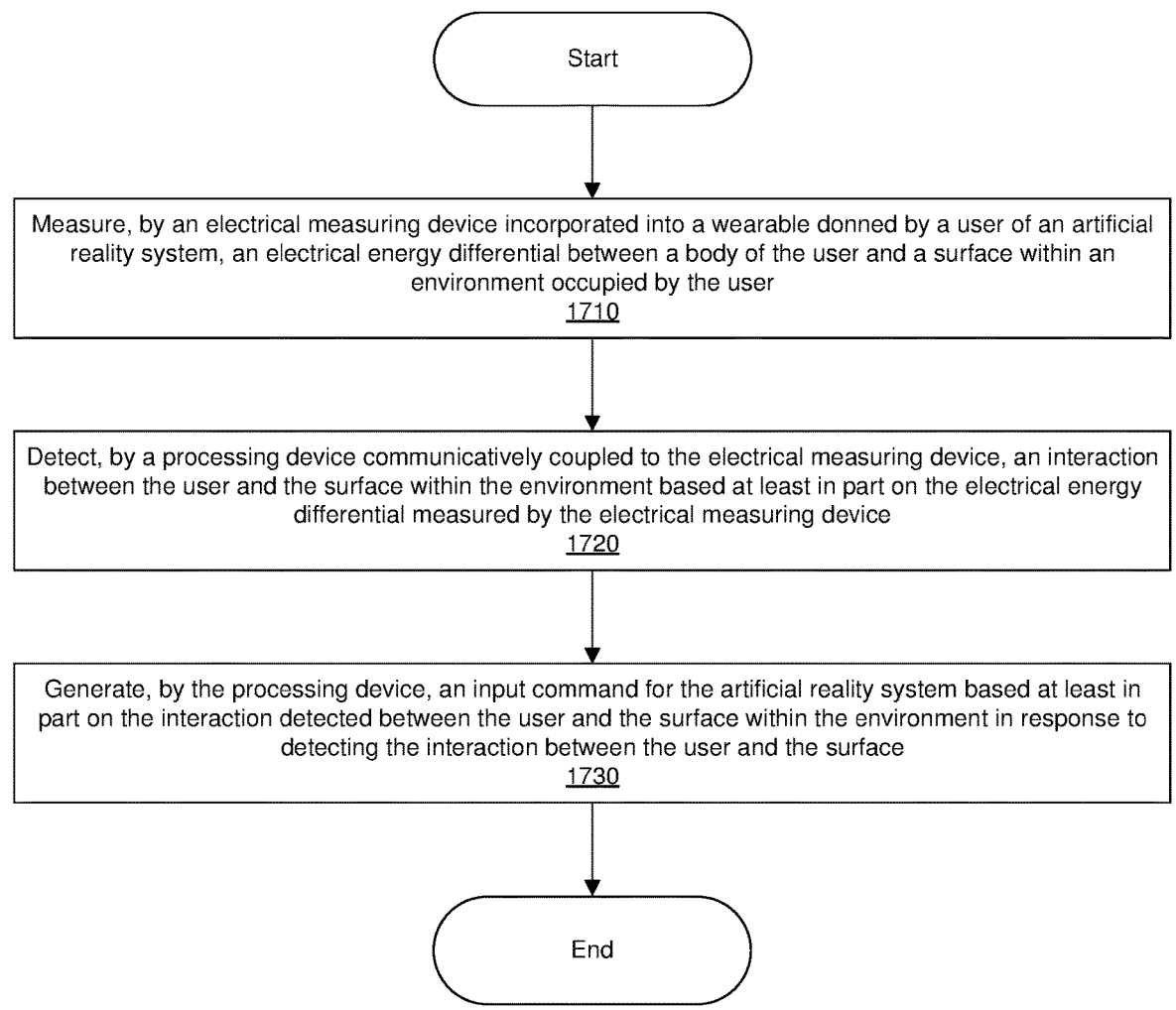
FIG. 17 is a flow diagram of an exemplary method for electric discharge-based sensing via wearables donned by users of artificial reality systems.

FIG. 17 is a flow diagram of an exemplary method 1700 for electric discharge-based sensing via wearables donned by users of artificial reality systems. The steps shown in FIG. 17 may be performed by certain devices incorporated into a wearable of an artificial reality system. Moreover, the steps shown in FIG. 17 may also incorporate and/or involve various sub-steps and/or variations consistent with the descriptions provided above in connection with FIGS. 7-16.

As illustrated in FIG. 17, at step 1710, an electrical measuring device incorporated into a wearable donned by a user of an artificial reality system may measure an electrical energy differential between a body of the user and a surface within an environment occupied by the user. For example, energy measuring device 706 may measure an electrical energy differential between a user's body and a surface within an environment occupied by the user. In one example, the electrical energy differential measured by energy measuring device 706 may include and/or represent an electric potential between the user and the surface. Additionally or alternatively, the electrical energy differential measured by energy measuring device 706 may include and/or represent the amount of electric charge and/or current flow transmitted and/or exchanged between the user and the surface.

At step 1720 in FIG. 17, a processing device incorporated into the wearable may detect an interaction between the user and the surface within the environment based at least in part on the electrical energy differential measured by the electrical measuring device. For example, processing device 708 may detect that the user is touching the surface within the environment based at least in part on the electrical energy differential measured by the energy measuring device 706. Additionally or alternatively, processing device 708 may detect that the user has released (or is no longer touching) the surface within the environment based at least in part on the electrical energy differential measured by the energy measuring device 706.

At step 1730 in FIG. 17, the processing device may generate an input command for the artificial reality system based at least in part on the interaction detected between the user and the surface within the environment in response to detecting the interaction between the user and the surface. For example, processing device 708 may generate an input command for the artificial reality system in response to detecting the interaction between the user and the surface. In this example, the input command may account for the interaction detected between the user and the surface. The input command may be used to modify at least one virtual component of the artificial reality system such that the user's artificial reality experience reflects the interaction.

As described above in connection with FIGS. 7-17, a system may detect and/or sense electrostatic discharge via a wearable (e.g., a wristband) worn by an artificial reality user. The system may be able to measure the electric potential between the body of the user and the user's environment (e.g., the floor on which the user is standing). Additionally or alternatively, the system may be able to measure the amount of charge flowing from the user's body to the user's environment. These measurements may represent and/or be used to detect physical contact, movement, and/or gestures made by the user within the environment.

For example, the wearable may include a body-charging device and an energy measuring device. In this example, the body-charging device may ionize the user's body such that the user's body builds up a charge relative to his or her environment. When the user touches a reference surface with his or her finger, the wearable may measure the amount of discharge released from the user's body with respect to that surface. This measurement may indicate that the user's finger has actually made physical contact with the surface. In response to such contact, the system may modify the user's artificial reality experience to account for the user having touched the surface with his or her finger.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a wearable dimensioned to be donned by a user of an artificial reality system;
an energy measuring device incorporated into the wearable, wherein the energy measuring device measures an amount of electric charge transferred between a body of the user and a surface of an object capable of conducting an electric charge;
a body-charging device that charges the body of the user relative to the surface of the object, wherein the body-charging device comprises:
a grounding electrode that establishes an electrical reference to the surface; and
a charging electrode that electrically couples an output of the body-charging device to the body of the user; and
at least one processing device communicatively coupled to the energy measuring device, wherein the processing device:
detects, based at least in part on the amount of electric charge transfer measured by the energy measuring device, an interaction between the user and the surface of the object; and
in response to detecting the interaction between the user and the surface of the object, generates an input command for the artificial reality system based at least in part on the interaction detected between the user and the surface.

2. The system of claim 1, wherein:
the amount of electric charge transfer comprises an amount of electric potential between the body of the user and the surface of the object;
the energy measuring device comprises an electrometer that:
electrically grounds to the body of the user; and
measures the amount of electric potential between the body of the user and the surface of the object; and
the processing device detects the interaction between the user and the surface based at least in part on the amount of electric potential measured by the electrometer.

3. The system of claim 2, wherein:
the amount of electric potential measured by the electrometer comprises an electric charge transferred from the body of the user to the surface of the object when the user touches the surface with a body part; and
the interaction between the user and the surface of the object comprises the touching of the surface by the body part of the user.

4. The system of claim 3, wherein the processing device:
analyzes the amount of electric charge transfer measured by the electrometer; and
determines that the user has touched the surface based at least in part on the analysis of the amount of electric charge transfer measured by the electrometer.

5. The system of claim 1, wherein:
the amount of electric charge transfer comprises an amount of electric current flowing from the surface of the object to the body of the user;
the energy measuring device comprises a current monitor that measures the amount of electric current flowing from the surface to the body of the user via a skin-touching electrode that electrically couples to the body of the user; and
the processing device detects the interaction between the user and the surface based at least in part on the amount of electric current flowing from the surface to the body of the user.

6. The system of claim 5, further comprising:
a surface-charging device incorporated into the wearable, wherein the surface-charging device charges the surface of the object via a surface-charging electrode that electrically couples the surface-charging device to the surface; and
wherein the interaction between the user and the surface of the object comprises a touching of the surface by a body part of the user.

7. The system of claim 6, wherein the processing device:
analyzes the amount of electric current measured by the current monitor; and
determines that the user has touched the surface based at least in part on the analysis of the electric current measured by the current monitor.

8. The system of claim 1, wherein the processing device:
analyzes the amount of electric charge transfer measured by the energy measuring device via a machine learning model;
detects, within the amount of electric charge transfer via the machine learning model, a pattern indicative of the user touching the surface; and determines, based at least in part on the pattern detected within the amount of electric charge transfer via the machine learning model, that the user has touched the surface.

9. The system of claim 1, wherein the input command generated by the processing device facilitates modifying at least one virtual component of the artificial reality system to account for the interaction detected between the user and the surface.

10. The system of claim 1, wherein the interaction between the user and the surface of the object comprises at least one of:
a touching of the body of the user to the surface; or
a releasing of the body of the user from the surface.

11. A wearable comprising:
a fastener dimensioned to facilitate securing the wearable to a user of an artificial reality system;
an energy measuring device that measures an amount of electric charge transferred between a body of the user and a surface of an object capable of conducting an electric charge;
a body-charging device that charges the body of the user relative to the surface of the object, wherein the body-charging device comprises:
a grounding electrode that establishes an electrical reference to the surface; and
a charging electrode that electrically couples an output of the body-charging device to the body of the user; and
at least one processing device communicatively coupled to the energy measuring device, wherein the processing device:
detects, based at least in part on the amount of electric charge transfer measured by the energy measuring device, an interaction between the user and the surface of the object; and
in response to detecting the interaction between the user and the surface of the object, generates an input command for the artificial reality system based at least in part on the interaction detected between the user and the surface.

12. The wearable of claim 11, wherein:
the amount of electric charge transfer comprises an amount of electric potential between the body of the user and the surface of the object;
the energy measuring device comprises an electrometer that:
electrically grounds to the body of the user; and
measures the amount of electric potential between the body of the user and the surface of the object; and
the processing device detects the interaction between the user and the surface based at least in part on the amount of electric potential measured by the electrometer.

13. The wearable of claim 12, wherein:
the amount of electric potential measured by the electrometer comprises an electric charge transferred from the body of the user to the surface of the object when the user touches the surface with a body part; and
the interaction between the user and the surface of the object comprises the touching of the surface by the body part of the user.

14. The wearable of claim 13, wherein the processing device:
analyzes the amount of electric charge transfer measured by the electrometer; and
determines that the user has touched the surface based at least in part on the analysis of the amount of electric charge transfer measured by the electrometer.

15. The wearable of claim 11, wherein:
the amount of electric charge transfer comprises an amount of electric current flowing from the surface of the object to the body of the user;
the energy measuring device comprises a current monitor that measures the amount of electric current flowing from the surface to the body of the user via a skin-touching electrode that electrically couples to the body of the user; and
the processing device detects the interaction between the user and the surface based at least in part on the amount of electric current flowing from the surface to the body of the user.

16. The wearable of claim 15, further comprising:
a surface-charging device incorporated into the wearable, wherein the surface-charging device charges the surface of the object via a surface-charging electrode that electrically couples the surface-charging device to the surface; and
wherein the interaction between the user and the surface of the object comprises a touching of the surface by a body part of the user.

17. The wearable of claim 16, wherein the processing device:
analyzes the amount of electric current measured by the current monitor; and
determines that the user has touched the surface based at least in part on the analysis of the electric current measured by the current monitor.

18. A method comprising:
measuring, by an electrometer incorporated into a wearable donned by a user of an artificial reality system, an amount of electric charge transfer between a body of the user and a surface of an object capable of conducting an electric charge, wherein the amount of electric charge transfer comprises an electric charge transferred from the body of the user to the surface of the object when the user touches the object;
charging, by a body-charging device, the body of the user relative to the surface of the object, wherein the body-charging device comprises:
a grounding electrode that establishes an electrical reference to the surface; and
a charging electrode that electrically couples an output of the body-charging device to the body of the user;
detecting, by a processing device communicatively coupled to the electrometer, an interaction between the user and the surface of the object based at least in part on the amount of electric charge transfer measured by the electrometer; and
generating, by the processing device, an input command for the artificial reality system based at least in part on the interaction detected between the user and the surface of the object in response to detecting the interaction between the user and the surface.

* * * * *